US011558187B2

(12) United States Patent
Kumar et al.

(10) Patent No.: US 11,558,187 B2
(45) Date of Patent: Jan. 17, 2023

(54) METHOD AND AN APPARATUS FOR ONBOARDING IN AN IOT NETWORK

(71) Applicant: Samsung Electronics Co., Ltd., Suwon-si (KR)

(72) Inventors: Vinay Kumar, Bangalore (IN); Vijaya Kumar Tukka, Bangalore (IN); Deepraj Prabhakar Patkar, Bangalore (IN); Sravana Kumar Karivedala, Bangalore (IN); Ashok Babu Channa, Bangalore (IN); Sujay M, Bangalore (IN); Rakesh Kumar, Samastipur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 16/105,628

(22) Filed: Aug. 20, 2018

(65) Prior Publication Data
US 2019/0058586 A1    Feb. 21, 2019

(30) Foreign Application Priority Data

Aug. 18, 2017  (IN) .............................. 201741029394
Aug. 16, 2018  (IN) .............................. 201741029394

(51) Int. Cl.
*H04L 29/06*  (2006.01)
*H04L 9/08*   (2006.01)
(Continued)

(52) U.S. Cl.
CPC .......... *H04L 9/0861* (2013.01); *H04L 9/0866* (2013.01); *H04L 9/3231* (2013.01);
(Continued)

(58) Field of Classification Search
CPC ... H04L 9/0861; H04L 9/0866; H04L 9/3231; H04L 63/0428; H04L 63/08; H04L 67/12;
(Continued)

(56) References Cited

U.S. PATENT DOCUMENTS 10,158,536 B2 * 12/2018 Kim ................... H04W 12/0401
10,396,985 B1 *  8/2019 Nagelberg ............ H04L 9/3239
(Continued)

FOREIGN PATENT DOCUMENTS

CN        105262587 A      1/2016
KR   10-2015-0051568 A     5/2015

OTHER PUBLICATIONS

International Search Report dated Nov. 26, 2019, issued in International Patent Application No. PCT/KR2018/009531.
(Continued)

*Primary Examiner* — Carl G Colin
*Assistant Examiner* — Andrew Suh
(74) *Attorney, Agent, or Firm* — Jefferson IP Law, LLP

(57) ABSTRACT

An apparatus and method for joining an Internet of Things (IoT) network are provided, the apparatus including a communicator configured to receive, from an electronic device, an encrypted auto-onboard configuration data associated with the IoT network, a sensor configured to detect a user command, and at least one processor configured to generate a decryption key based on features extracted from the user command, decrypt the encrypted auto-onboard configuration data using the decryption key, and join the IoT network.

13 Claims, 18 Drawing Sheets

(51) Int. Cl.
  *H04L 67/12* (2022.01)
  *H04L 9/40* (2022.01)
  *H04L 67/00* (2022.01)
  *H04W 12/06* (2021.01)
  *H04W 12/02* (2009.01)
  *H04W 4/70* (2018.01)
  *H04L 9/32* (2006.01)

(52) U.S. Cl.
  CPC .......... *H04L 63/0428* (2013.01); *H04L 63/08* (2013.01); *H04L 67/12* (2013.01); *H04L 67/34* (2013.01); *H04W 4/70* (2018.02); *H04W 12/02* (2013.01); *H04W 12/06* (2013.01); *H04L 2209/805* (2013.01)

(58) Field of Classification Search
  CPC .... H04L 67/34; H04L 2209/805; H04W 4/70; H04W 12/02; H04W 12/06
  See application file for complete search history.

(56) References Cited

U.S. PATENT DOCUMENTS

| | | | |
|---|---|---|---|
| 2006/0013402 | A1 | 1/2006 | Sutton, II et al. |
| 2007/0214356 | A1 | 9/2007 | Song et al. |
| 2009/0031140 | A1* | 1/2009 | Abdallah ............... H04L 9/3231 713/186 |
| 2013/0007442 | A1 | 1/2013 | Mao et al. |
| 2014/0093079 | A1 | 4/2014 | Scott et al. |
| 2014/0310536 | A1 | 10/2014 | Shacham |
| 2015/0117639 | A1* | 4/2015 | Feekes ....................... H04L 9/16 380/28 |
| 2015/0121470 | A1 | 4/2015 | Rongo et al. |
| 2015/0312041 | A1* | 10/2015 | Choi ................... H04L 63/0861 713/175 |
| 2015/0317467 | A1 | 11/2015 | Rattner et al. |
| 2016/0103984 | A1* | 4/2016 | Warrier ................. G06F 21/606 713/186 |
| 2016/0110295 | A1* | 4/2016 | Hashimoto ......... G06F 9/45533 713/189 |
| 2016/0173156 | A1* | 6/2016 | Wane .................. H04L 63/0861 455/558 |
| 2016/0212099 | A1 | 7/2016 | Zou et al. |
| 2016/0262019 | A1 | 9/2016 | Suh |
| 2016/0330182 | A1* | 11/2016 | Jeon ..................... A43B 3/0005 |
| 2016/0381003 | A1 | 12/2016 | Caceres et al. |
| 2017/0011210 | A1* | 1/2017 | Cheong .................. G06F 3/017 |
| 2017/0055148 | A1* | 2/2017 | Zimmerman ........... H04W 4/70 |
| 2017/0202046 | A1* | 7/2017 | Lee ......................... H04W 4/08 |
| 2017/0293749 | A1* | 10/2017 | Baek ....................... G06F 21/32 |
| 2018/0041343 | A1* | 2/2018 | Chen ..................... H04L 9/0897 |
| 2019/0008461 | A1* | 1/2019 | Gupta .................... G16H 10/40 |
| 2021/0029112 | A1* | 1/2021 | Palle ...................... G06F 21/32 |

OTHER PUBLICATIONS

Espy-Wilson, Carol, et al., "A New Set of Features for Text-Independent Speaker Identification", Institute for Systems Research and Dept. of Electrical & Computer Engineering, University of Maryland, College Park, MD, USA 20742.

Gilburg, Jennifer, "Zero Touch Device Onboarding for IoT Control Platforms", RSA Conference 2017, Feb. 13-17, Moscone Center, San Francisco, SP02-R10.

Kanellos, Michael, "152,000 Smart Devices Every Minute in 2025: IDC Outlines The Future of Smart Things", Green Tech, Mar. 3, 2016.

Anonymous; A Cost-Effective Foundation for End-to-End IoT Security; Intel; White Paper IOT Security; XP055678399; URL:https://www.intel.com/content/dam/www/public/us/en/documents/white-papers/intelepid-white-paper.pdf; Sep. 30, 2016.

European Search Report dated Mar. 30, 2020; European Appln. No. 18846301.2-1218 / 3619886 PCT/KR2018009531.

* cited by examiner

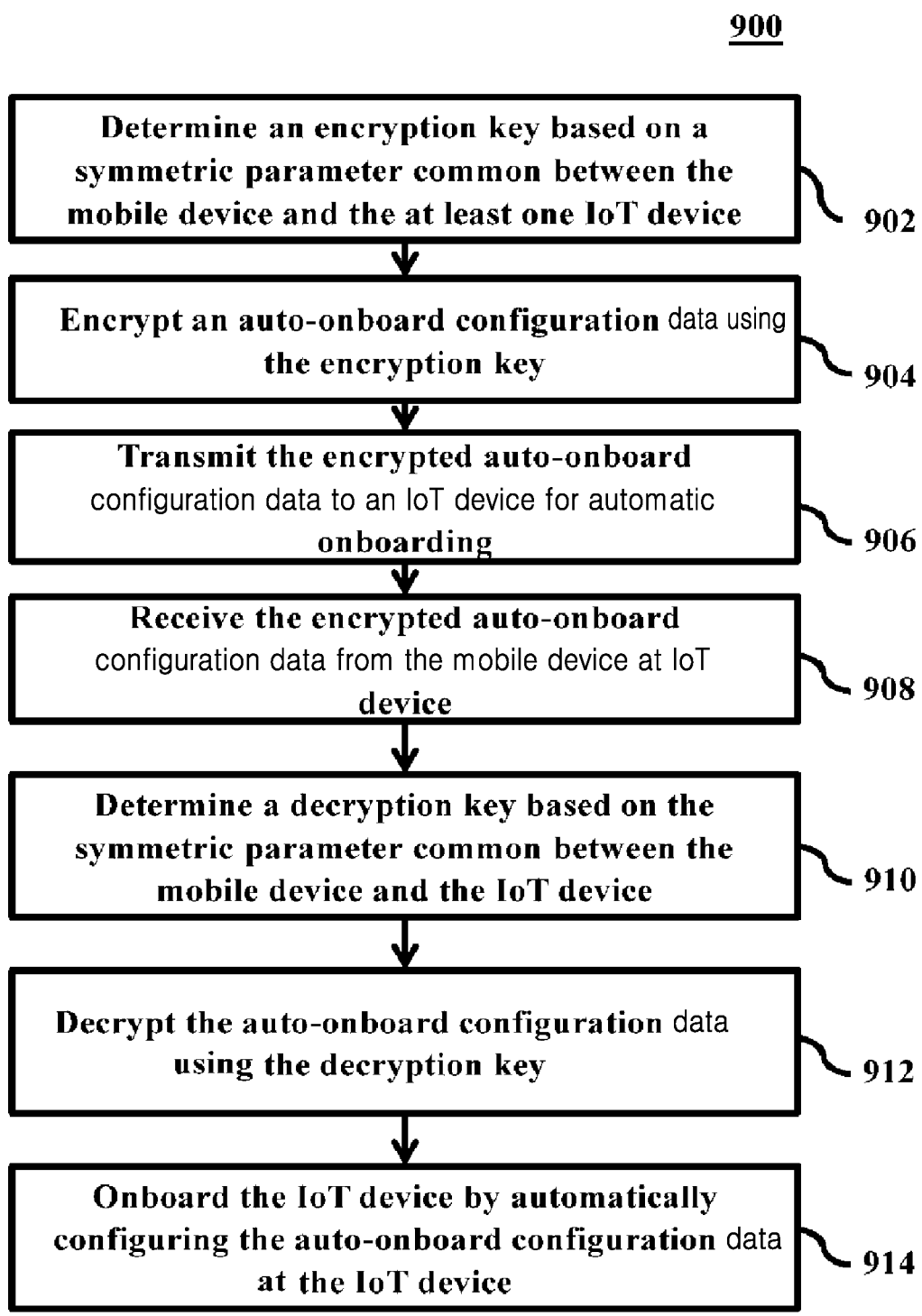

METHOD AND AN APPARATUS FOR ONBOARDING IN AN IOT NETWORK

CROSS-REFERENCE TO RELATED APPLICATION(S)

This application is based on and claims priority under 35 U.S.C. § 119(a) of an Indian Provisional Patent Application Number 201741029394 filed on Aug. 18, 2017, in the Indian Patent Office, and of an Indian Complete Patent Application Number 201741029394 filed on Aug. 16, 2018, in the Indian Patent Office, the disclosure of each of which is hereby incorporated by reference in its entirety.

BACKGROUND

The disclosure relates to device authentication and onboarding of devices in an Internet of Things (IoT) network.

The above information is presented as background information only to help the reader to understand the present disclosure. Applicants have made no determination and make no assertion as to whether any of the above might be applicable as Prior Art with regard to the present application.

SUMMARY

Aspects of the disclosure are to address at least the above-mentioned problems and/or disadvantages and to provide at least the advantages described below. Accordingly, an aspect of the disclosure is to provide a method for automatically onboarding Internet of Things (IoT) devices in an IoT network. The method includes detecting by an electronic device a voice command to automatically onboard at least one IoT device proximal to the electronic device, generating by the electronic device an encryption or a symmetric key based on the voice command, encrypting by the electronic device the auto-onboard configuration using the generated encryption or symmetric key and sharing by the electronic device the encrypted auto-onboard configuration to the at least one IoT device to automatically onboard the at least one IoT device in the IoT network.

Additional aspects will be set forth in part in the description which follows and, in part, will be apparent from the description, or may be learned by practice of the presented embodiments.

According to an aspect of the disclosure, the method further includes receiving by the at least one IoT device the encrypted auto-onboard configuration from the electronic device, generating by the at least one IoT device a decryption or symmetric key based on the same voice command, decrypting by the at least one IoT device the auto-onboard configuration using generated decryption key and onboarding the at least one IoT device in the IoT network by automatically configuring the auto-onboard configuration at the at least one IoT device.

According to an aspect of the disclosure, the method further includes receiving by the electronic device a voice response indicating that the at least one IoT device is on-boarded in a guest account of the IoT network, validating by the electronic device the all IoT device on-boarded currently to the guest account and automatically enabling by the electronic device an access permission to the at least one IoT device to onboard in a non-guest account in response to a successful validation of the at least one IoT device.

According to an aspect of the disclosure, the method to onboard the at least one IoT device in the IoT network by automatically configuring the auto-onboard configuration at the at least one IoT device includes onboarding the at least one IoT device in a guest account of the IoT network, sending by the at least one IoT device a voice response indicating that the at least one IoT device is on-boarded in the guest account to the electronic device, receiving by the at least one IoT device an access permission to a non-guest account from the electronic device and automatically onboarding the at least one IoT device in a non-guest account in the IoT network.

According to an aspect of the disclosure, the method includes extracting voice features from the voice command, wherein the voice features are at least one of voice text, a tract size, a vocal tract shape, a frequency, an amplitude, an aperiodic energy, a spectral slope in the voice command, determining an initialization vector based on the voice features and generating a decryption or symmetric key using the initialization vector.

According to an aspect of the disclosure, the method includes sharing of the encrypted auto-onboard configuration with the at least one IoT device comprises through one of Bluetooth and ultrasound.

According to an aspect of the disclosure, embodiments disclosed herein provide a method for automatically onboarding IoT devices in an IoT network. The method includes detecting by at least one IoT device a voice command provided at an electronic device in proximity to the at least one IoT device, wherein the same voice command is provided to the electronic device to onboard the at least one IoT device in the IoT network. The method further includes generating a decryption key based on the voice command, receiving by the at least one IoT device an encrypted auto-onboard configuration from the electronic device, decrypting by the at least one IoT device the encrypted auto-onboard configuration using a decryption key, onboarding the at least one IoT device in the IoT network by automatically configuring the auto-onboard configuration at the at least one IoT device and sending by the at least one IoT a voice response indicative of the at least one IoT device being automatically on-boarded to the electronic device.

According to an aspect of the disclosure, embodiments disclosed herein provide a method for automatically onboarding IoT devices in an IoT network. The method includes determining by an electronic device an encryption key based on a symmetric parameter common between the electronic device and the at least one IoT device, encrypting by the electronic device an auto-onboard configuration using the encryption key, and transmitting by the electronic device the encrypted auto-onboard configuration to at least one IoT device to automatically onboard the at least one IoT device in the IoT network.

According to an aspect of the disclosure, the method includes receiving by the at least one IoT device the encrypted auto-onboard configuration from the electronic device, determining by the at least one IoT device a decryption key based on the symmetric parameter common between the electronic device and the at least one IoT device, decrypting by the at least one IoT device the encrypted auto-onboard configuration using a decryption key, wherein at least one portion of the encryption key is symmetric to at least one portion of the decryption key based on the symmetric parameter and onboarding the at least one IoT device in the IoT network by automatically configuring the auto-onboard configuration at the at least one IoT device.

According to an aspect of the disclosure, the method includes determining whether the at least one IoT device has received the decryption key from a key source, performing one of retrieving the decryption key from the at least one IoT device in response to determining that the at least one IoT device has received the decryption key from a key source and generating the decryption key based on the symmetric parameter in response to determining that the at least one IoT device has not received the encryption key from a key source and sharing the generated encryption key with the key source.

According to an aspect of the disclosure, the symmetric parameter comprises at least one of an identifier associated with the electronic device and the at least one IoT and an identifier associated with a user of the electronic device and the at least one IoT.

According to an aspect of the disclosure, the method includes determining whether the electronic device has received the encryption key from a key source, performing one of retrieving the encryption key from the electronic device in response to determining that the electronic device has received the encryption key from a key source and generating the encryption key based on the symmetric parameter in response to determining that the electronic device has not received the encryption key from a key source and sharing the generated encryption key with the key source.

According to an aspect of the disclosure, embodiments disclosed herein provide a method for automatically onboarding IoT devices in an IoT network. The method includes receiving by at least one IoT device an auto-onboard configuration encrypted using an encryption key from an electronic device, determining by the at least one IoT device a decryption key based on a symmetric parameter common between the electronic device and the at least one IoT device, wherein at least one portion of the encryption key is symmetric to at least one portion of the decryption key, decrypting by the at least one IoT device the encrypted auto-onboard configuration using the decryption key and automatically onboarding the at least one IoT device in the IoT network by automatically configuring the auto-onboard configuration at the at least one IoT device.

According to an aspect of the disclosure, embodiments disclosed herein provide a system for automatically onboarding at least one IoT device in proximity to an electronic device in an IoT network. The at least one IoT device and the electronic device are configured to detect a first voice command at the at least one IoT device and the electronic device, automatically activate a voice assistance application at the at least one IoT device and the electronic device, detect a second voice command to automatically onboard the at least one IOT device in the IoT network and automatically onboard the electronic device and the at least one IoT device in the IoT network by automatically configuring an auto-onboard configuration at the at least one IoT device and the electronic device.

According to an aspect of the disclosure, embodiments disclosed herein provide a system for automatically onboarding at least one IoT device in proximity to an electronic device in an IoT network using a key source, wherein the at least one IoT device, the key source and the electronic device are configured to determine an encryption key at the electronic device based on a first communication between the key source and the electronic device, determine a decryption key at the at least one IoT device based on a second communication between the key source and the at least one IoT device, wherein at least one portion of the encryption key is symmetric to at least one portion of the decryption key, transmit an auto-onboard configuration encrypted using the encryption key from the electronic device to the at least one IoT device, decrypt the encrypted auto-onboard configuration using the decryption key and onboard the at least one IoT device in the IoT network by automatically configuring the auto-onboard configuration at the at least one IoT device.

According to an aspect of the disclosure, embodiments disclosed herein provide an electronic device for automatically onboarding IoT devices in an IoT network. The electronic device includes a voice sensor detecting a voice command to automatically onboard at least one IoT device proximal to the electronic device and a key generator coupled to the voice sensor. The key generator is configured to generate an encryption key based on the voice command, encrypt the auto-onboard configuration using the encryption key and share the encrypted auto-onboard configuration to the at least one IoT device to automatically onboard the at least one IoT device in the IoT network.

According to an aspect of the disclosure, embodiments disclosed herein provide an IoT device being automatically on-boarded in an IoT network. The IoT device includes a voice sensor and a key authenticator. The voice sensor detects a voice command provided at an electronic device in proximity to the IoT device, wherein the voice command is provided to the electronic device to onboard the at least one IoT device in the IoT network. The key authenticator is coupled to the voice sensor. The key authenticator is configured to generate a decryption key based on the voice command, receive by the at least one IoT device an encrypted auto-onboard configuration from the electronic device, decrypt by the at least one IoT device the encrypted auto-onboard configuration using a decryption key, onboard the IoT device in the IoT network by automatically configuring the auto-onboard configuration at the IoT device and send a voice response indicative of the at least one IoT device being automatically on-boarded to the electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a flow diagram illustrating a method for onboarding bulk IoT devices with a pre-shared key, according to an embodiment of the disclosure;

Throughout the drawings, it should be noted that like reference numbers are used to depict the same or similar elements, features, and structures.

DETAILED DESCRIPTION

Figure 1A:
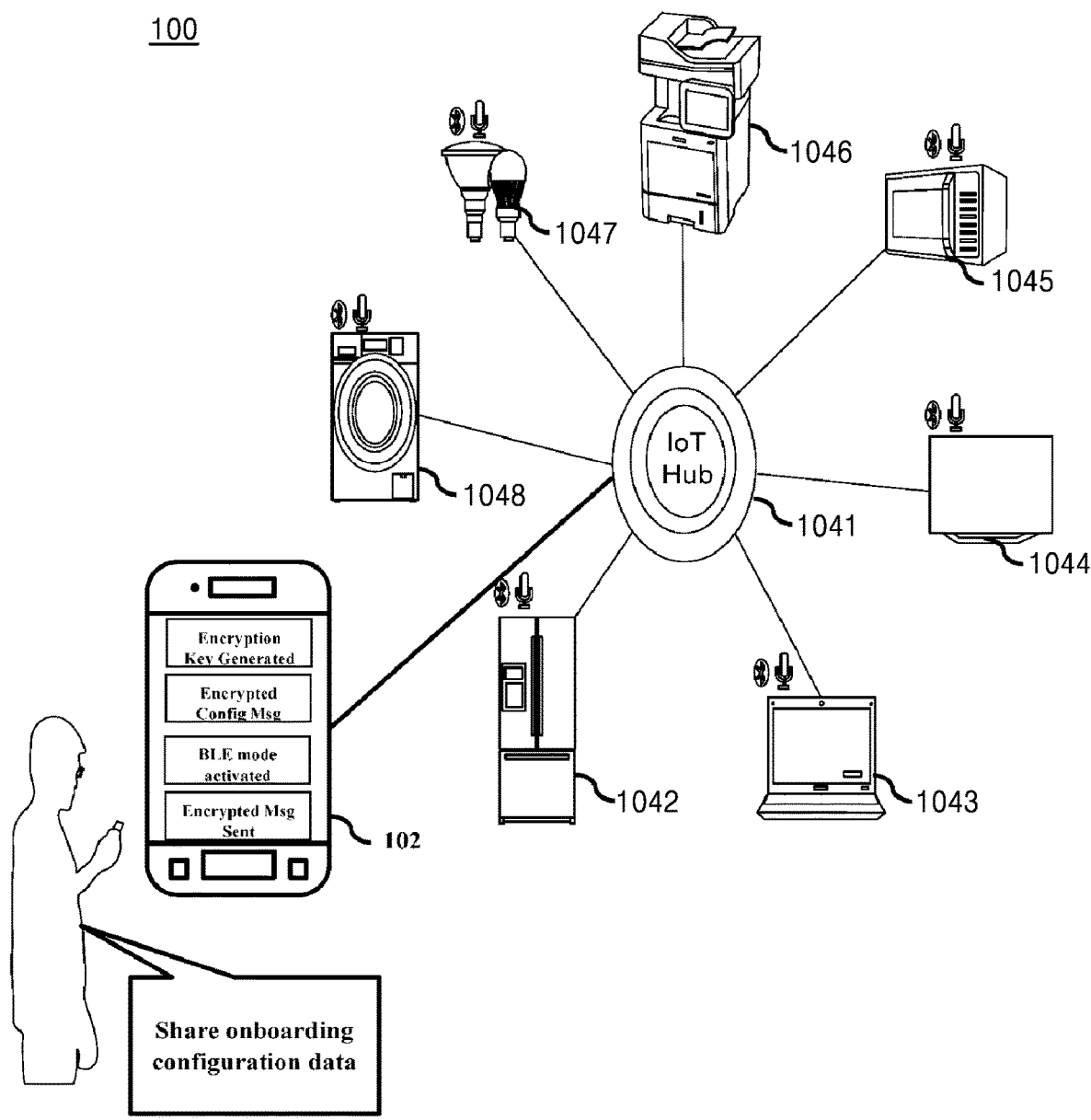
FIG. 1A illustrates a system for automatically onboarding of IoT devices using voice commands, according to an embodiment of the disclosure.

The following description with reference to the accompanying drawings is provided to assist in a comprehensive understanding of various embodiments of the disclosure as defined by the claims and their equivalents. It includes various specific details to assist in that overall understanding but are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. Also, the various embodiments described herein are not necessarily mutually exclusive, as some embodiments can be combined with one or more other embodiments to form new embodiments. Further, it should be possible to combine the flows specified in different figures to derive a new flow.

Onboarding is a process of registration of new device to be part of an Internet of Things (IoT) network by sharing configuration details. Onboarding is also a process of provisioning a device with credentials for accessing a network resource and assigning appropriate permissions. For example, a new smartphone can be on-boarded in a home wireless fidelity (Wi-Fi) network by sharing the Wi-Fi username and password with the smartphone. Conventional methods of onboarding require multiple steps that include discovering devices to be added, establishing a communication channel between the devices to be added and a network hub, sharing credentials of the devices to be added, and authenticating the devices. Apart from needing manual intervention, existing methods of onboarding fail to provide solutions for onboarding multiple devices into the IoT network in a single step. Thus, there is a need for a mechanism that enables bulk onboarding of IoT devices in the IoT network. Conventional methods for onboarding are limited to onboarding one device at a time and require multiple steps and much of manual intervention of the user. Onboarding is a process of registration of new device to be part of an Internet of Things (IoT) network by sharing configuration details. Manual onboarding of a single device at a time requires considerable user intervention. The onboarding of a single device at a time can require multiple steps such as, but not limited to, scanning for available devices, select a device to be on-boarded and sharing configuration data to the selected device. Some conventional methods include scanning by an electronic device for IoT devices in the IoT network, providing a user interface on the electronic device facilitating selection of IoT devices that are detected through the scanning, and sharing configuration data with a selected IoT device.

Embodiments disclosed herein provide a method for automatically onboarding IoT devices in an IoT network. The method includes detecting by the electronic device a voice command to automatically onboard at least one IoT device proximal to the electronic device. An encryption or a symmetric key based on the voice command is generated by the electronic device. The auto-onboard configuration is encrypted using the generated encryption or symmetric key and upon encryption, the auto-onboard configuration is further shared by the electronic device to the at least one IoT device to automatically onboard the at least one IoT device in the IoT network.

The onboarding of bulk IoT devices is performed using voice commands by considering the device consist of a microphone. A user can provide voice data for generating an encryption key (k1) by authenticating with the user device. After generating the encryption key (k1), the electronic device can encrypt configuration details using the encryption key (k1) and activates its communication module such as Bluetooth or ultrasound for broadcasting encrypted configuration data. A target IoT device goes into scanning mode, while receiving the user voice data and generates a decryption key (k1) using the same user voice data. The target IoT device can receive encrypted configuration messages via wireless communication such as Bluetooth or ultrasound from the electronic device and decrypt it using key (k1). The target IoT device is on-boarded on the IoT network using the decrypted configuration data.

According to another embodiment of the present disclosure, all new IoT devices to be on-boarded may already have a pre-shared key set by the vendor or manufacturer. The pre-shared key can also be generated using a combination of serial number of the electronic device and the IoT device(s), manufacturer name, device types, and customer details. The user manually onboards only one IoT device using any onboarding techniques. The on-boarded IoT device broadcasts onboarding information encrypted with the pre-shared key. Other new IoT devices can be automatically on-boarded upon decrypting the broadcast encrypted pre-shared key.

Referring now to the drawings and more particularly to FIG. 1A through FIG. 13B, where similar reference characters denote corresponding features consistently throughout the figure, there are shown preferred embodiments.

FIG. 1A illustrates a system 100 automatically onboarding of IoT devices using voice commands, according to an embodiment of the disclosure. Onboarding of IoT devices includes detecting by an electronic device 102 a voice command from a user to automatically onboard IoT devices 102, 1041 through 1048 in an IoT network proximal to the electronic device.

Referring to FIG. 1A, the electronic device 102 can be but not limited to a smartphone, a tablet computer, a personal computer, a robot, a smart speaker, a portable media player, personal digital assistant (PDA), a television, a television set-top box, a wearable electronic device, and the like. The electronic device 102 can communicate with other electronic devices or a server system through one or more communication networks including, but not limited to the Internet, an intranet, or any other wired or wireless public or private network. In some embodiments, the electronic device 102 can communicate through Bluetooth or ultrasound-based communication.

An encryption or a symmetric key based on the voice command is generated by the electronic device 102. The auto-onboard configuration data is encrypted using the generated encryption or symmetric key and upon encryption, the auto-onboard configuration data is further shared by the electronic device 102 with the IoT device to automatically onboard the IoT device in the IoT network. In some embodiments, the auto-onboard configuration data is shared with an IoT hub 1041 or a centralized IoT controller, as shown in FIG. 1A. The auto-onboard configuration data may be computer-readable data and/or computer readable information.

The IoT hub 1041 can be, but not limited to a smartphone, a tablet computer, a personal computer, a robot, a smart speaker, a portable media player, personal digital assistant (PDA), a television, a television set-top box, a wearable electronic device, and the like. The IoT hub 1041 can communicate with the electronic device 102 and other electronic devices or a server system through one or more communication networks including, but not limited to the Internet, an intranet, or any other wired or wireless public or private network. In some embodiments, the IoT hub 1041 can communicate through Bluetooth or ultrasound-based communication.

The IoT hub 1041 is connected to IoT devices 1042, 1043, 1044, 1045, 1046, 1047, and 1048 upon successful onboarding (hereinafter IoT hub 1041 and IoT devices 1042 through 1048 are collectively referred to as the "IoT devices 104." If the term of IoT devices 104 is used as a singular such as IoT device 104, then the IoT device 104 may indicate one device among the IoT devices 104 and vice versa).

In some embodiments, an IoT hub 1041 can be part of an Internet of Things (IoT) network. The IoT hub can control various nodes such as a thermostat, faucets, electrical appliances, phones and the like on the IoT network. For example, based on an interaction with the user, the IoT hub 1041 can direct the thermostat to lower temperature in a room.

The IoT devices 104 receive the encrypted auto-onboard configuration data from the electronic device 102, generate a decryption or symmetric key based on the same voice command, and decrypt the received auto-onboard configuration using the generated decryption key. The IoT devices 104 are on-boarded in the IoT network by automatically configuring the auto-onboard configuration at each of the IoT devices 104. The electronic device 102, in turn, receives a response indicative that IoT devices 104 have been on-boarded. The IoT devices 1042 through 1048 establish a connection with the IoT hub 1041 and enter a locked mode. The IoT devices 1042 through 1048 are locked for onboarding until the connection lasts or is reset In some embodiments, the IoT devices 104 can be on-boarded on a guest account and can be on-boarded in a non-guest account upon receiving an access permission to the non-guest account from the electronic device 102. The electronic device 102 can receive voice responses indicative of the IoT devices being on-boarded in a guest account or a non-guest account.

In some embodiments, generating the decryption or symmetric key based on the voice command includes extracting voice features from the received voice command by the IoT hub 1041. Voice features can be, but not limited to, a voice text, a tract size, a vocal tract shape, a frequency, an amplitude, aperiodic energy, a spectral slope in the voice command and the like. An initialization vector based on the voice features is determined, and accordingly, the decryption key is generated. Similarly, the electronic device 102 generates the encryption or symmetric key based on the voice command from the user by extracting the voice features from the voice command, determining an initialization vector based on the voice features and generating an encryption or symmetric key using the initialization vector. Therefore, the encryption key and the decryption key constitute a symmetric key pair.

In some embodiments, the system 100 automatically onboards the IoT devices 104 in proximity to the electronic device 102. The IoT devices 104 and the electronic device 102 detects a first voice command. A voice assistance application is activated at the IoT devices 104 and the electronic device 102 upon detecting the first voice command. A second voice command is detected by the electronic device 102 and the IoT devices 104. The electronic device 102 and the IoT devices 104 are automatically on-boarded in the IoT network by automatically configuring an auto-onboard configuration at the IoT devices 104 and the electronic device 102.

Figure 1B:
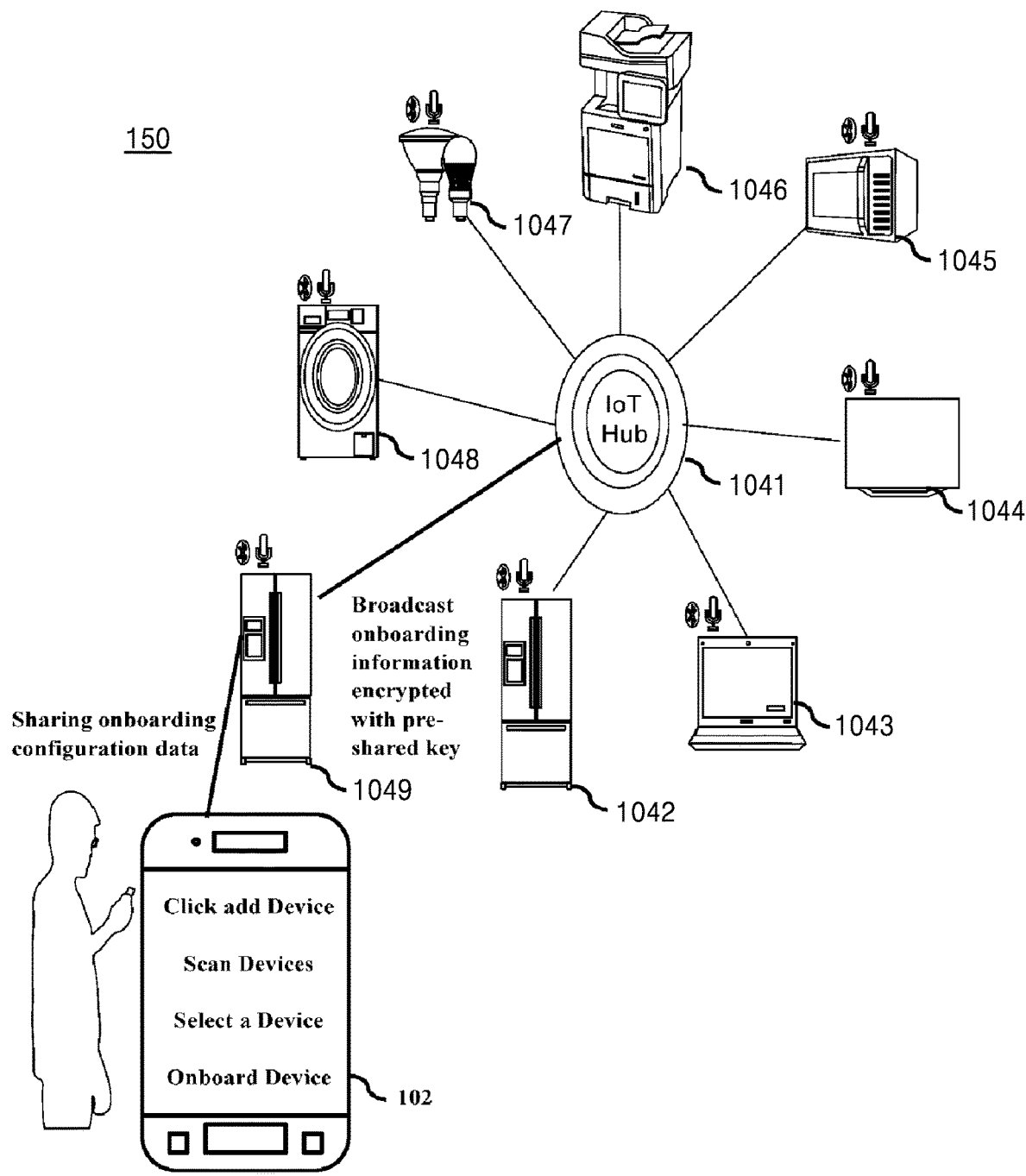
FIG. 1B illustrates a system for automatically onboarding of the IoT devices using a pre-shared key, according to an embodiment of the disclosure.

FIG. 1B illustrates a system 150 for automatically onboarding of the IoT devices 104 using a pre-shared key, according to an embodiment of the disclosure. An IoT device 1049 receives encrypted auto-onboard configuration data from the electronic device 102 where the auto-onboard configuration data is encrypted using an encryption key that is determined based on a symmetric parameter common between the electronic device 102 and the IoT device 1049. The IoT device 1049 determines a decryption key based on the symmetric parameter and uses the decryption key to decrypt the auto-onboard configuration data received from the electronic device 102. The IoT device 1049 is automatically on-boarded in the IoT network using the auto-onboard configuration data.

Referring to FIG. 1B, the decryption key is determined by validating or verifying whether the IoT device 1049 has received the same key from a key source. For example, all new IoT devices 104 can have a pre-shared key from a corresponding manufacturer which is used for decrypting the encrypted message. A user buying the IoT devices 104 can independently receive an encryption key corresponding to the decryption key stored on the IoT device. An order to buy IoT devices in a bulk quantity is placed. The manufacturer provides the same preconfigured key for all the IoT devices. All the IoT devices 1041 through 1048 are powered on. One IoT device (for example, IoT device 1049) is on-boarded manually. The on-boarded IoT device 1049 broadcasts the auto-onboard configuration data encrypted with a pre-shared key to all the other IoT devices 1042 through 1048. The pre-shared key is provided by the manufacturer to the user after the order is placed. The auto-onboard configuration data is decrypted with the pre-shared decryption key.

Hereinafter, the IoT devices 1041 to 1049 are collectively referred to as the IoT device(s) 104 for the ease of explanation.

In some embodiments, the system 150 is provided for automatically onboarding the IoT devices 104 in proximity to the electronic device 102 in an IoT network using a key source. An encryption key at the electronic device 102 is communicated via a first communication between the key source and the electronic device 102. A decryption key is determined at the IoT devices 104 based on a second communication between the key source and the IoT devices 104. At least one portion of the encryption key is symmetric to at least one portion of the decryption key. An auto-onboard configuration data encrypted using the encryption key from the electronic device 102 is transmitted to the IoT devices 104. The encrypted auto-onboard configuration data is decrypted using the decryption key. Consequently, the IoT devices 104 are on-boarded in the IoT network by automatically configuring the auto-onboard configuration at the IoT devices 104.

Figure 2:
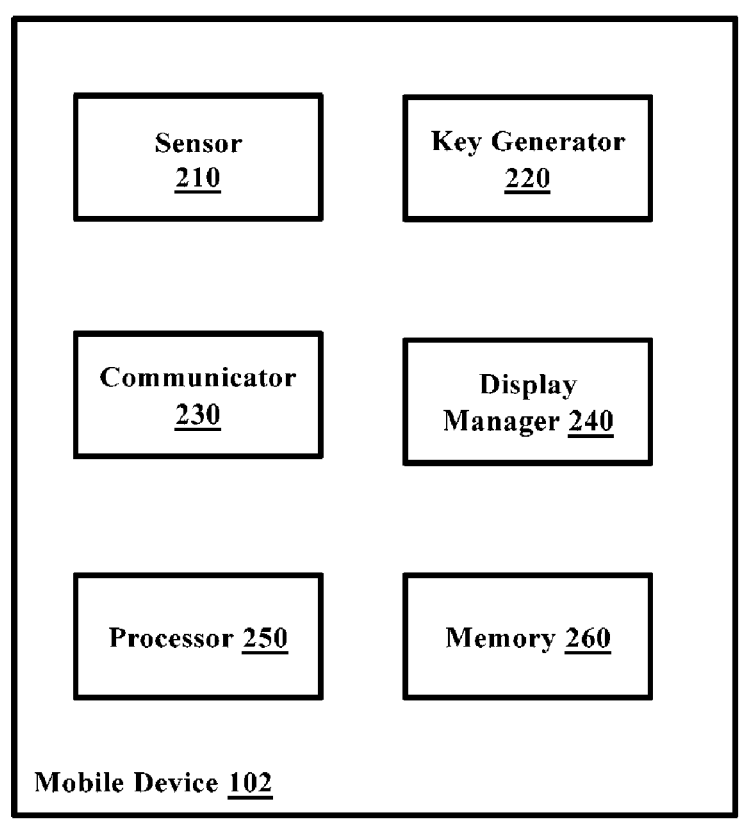
FIG. 2 is a block diagram illustrating hardware components of an electronic device, according to an embodiment of the disclosure.

FIG. 2 is a block diagram illustrating hardware components of an electronic device 102 according to an embodiment of the disclosure. The electronic device 102 includes a sensor 210, a key generator 220, a communicator 230, a display manager 240, a processor 250 and a memory 260.

Referring to FIG. 2, the processor 250 may be, but not restricted to, a Central Processing Unit (CPU), a microprocessor, or a microcontroller. The processor 250 may be coupled to the memory 260. The processor 250 can execute sets of instructions stored on the memory 260. Any generated encryption key and/or auto-onboard configuration data may be stored on the memory 260. In an embodiment, the key generator 220, the communicator 230, the display manager 240, and the processor 250 can be implemented as at least one hardware processor.

The memory 260 may include storage locations to be addressable by the processor 250. The memory 260 is not limited to a volatile memory and/or a non-volatile memory. Further, the memory 260 can include one or more computer-readable storage media. The memory 260 can include non-volatile storage elements. For example, non-volatile storage elements can include magnetic hard discs, optical discs, floppy discs, flash memories, or forms of electrically programmable memories (EPROM) or electrically erasable and programmable (EEPROM) memories. The embodiments of the present disclosure can be implemented through at least one software program running on at least one hardware device and performing network management functions to control the elements.

The sensor 210 may sense a user's input command and extract some features embedded in the user's input command. An initialization vector may be determined by the key generator 220 based on the features extracted from the input command. The key generator 220 may generate an encryption key based on the initialization vector. Auto-onboard configuration data may be encrypted using the encryption key and may be shared with the IoT devices 104 using the communicator 230.

In an embodiment, the sensor 210 can be a voice sensor such as a microphone or any voice input receiver that captures voice commands from the user. The processor 250 may extract voice features from the voice command. The voice features can include but are not limited to a tract size, a vocal tract shape, a frequency, an amplitude, an aperiodic energy and a spectral slope in the voice command. An initialization vector is determined by the key generator 220 based on the features extracted from the voice command.

The initialization vector is a fixed size input to a cryptographic scheme. The key generator 220 generates an encryption key based on the initialization vector. Auto-onboard configuration data is encrypted using the encryption key and is shared with the IoT devices 104 using the communicator 230.

In another embodiment, the sensor 210 can be another kind of sensor other than the microphone or any voice input receiver. For example, the sensor 210 can be, but not limited to, a fingerprint recognition sensor, a touch sensitive sensor, an iris recognition sensor, a vein recognition sensor, a face recognition sensor, a temperature sensor, a writing recognition sensor, etc. For the aforementioned respective sensors, the voice command may be replaced by a fingerprint input, a touch input, an iris input, a vein input, a face input, a temperature input by touching a part of a human body or other things, and a writing input, respectively. Features may be extracted from each of the user's input. For example, ridge patterns of the fingerprint may be extracted from the fingerprint input, a body temperature may be extracted from the temperature input based on a touch by a human body, and a writing pattern may be extracted from the writing input.

In some embodiments, the key generator 220 may determine an encryption key based on symmetric parameters common between the electronic device 102 and the IoT device 104. The symmetric parameters include at least one of identification information associated with the electronic device and the IoT devices and identification information associated with a user of the electronic device and a user of the IoT device 104. The symmetric parameters can be a model type pertaining to the electronic device 102 and a model type of the IoT device 104. For example, if the IoT device 104 is a refrigerator, the identification information can be an indicative of the IoT device 104 being a refrigerator, the electronic device 102 being a smartphone or a tablet computer and also the birth date or the social security number of the user. The encryption key is generated based on the symmetric parameters common between the electronic device 102 and the IoT device 104.

In some embodiments, the key generator 220 retrieves the encryption key in response to a determination that the electronic device 102 has received the encryption key from a key source (not shown). The key source can be, for example, a data repository of the manufacturer. In another embodiment, the key generator 220 may generate the encryption key based on the symmetric parameters in response to a determination that the electronic device 102 has not received the encryption key from the key source. The communicator 230 may share the generated encryption key with key source through a communication network.

The communicator 230 can be a transceiver that transmits and receives data through a communication network. The communication network can include a data network such as, but not restricted to, the Internet, local area network (LAN), wide area network (WAN), metropolitan area network (MAN) and the like. In certain embodiments, the communication network can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) and the like. Accordingly, the communicator 230 is included with communication components facilitating communications over the communication network. In some embodiments, the communication network can be an IoT network. In some other embodiments, the communicator 230 can receive and transmit data through the use of Bluetooth and/or ultrasonic waves.

The display manager 240 controls a display of the mobile device to display the status of on-boarded IoT devices 104 on the electronic device 102.

Figure 3:
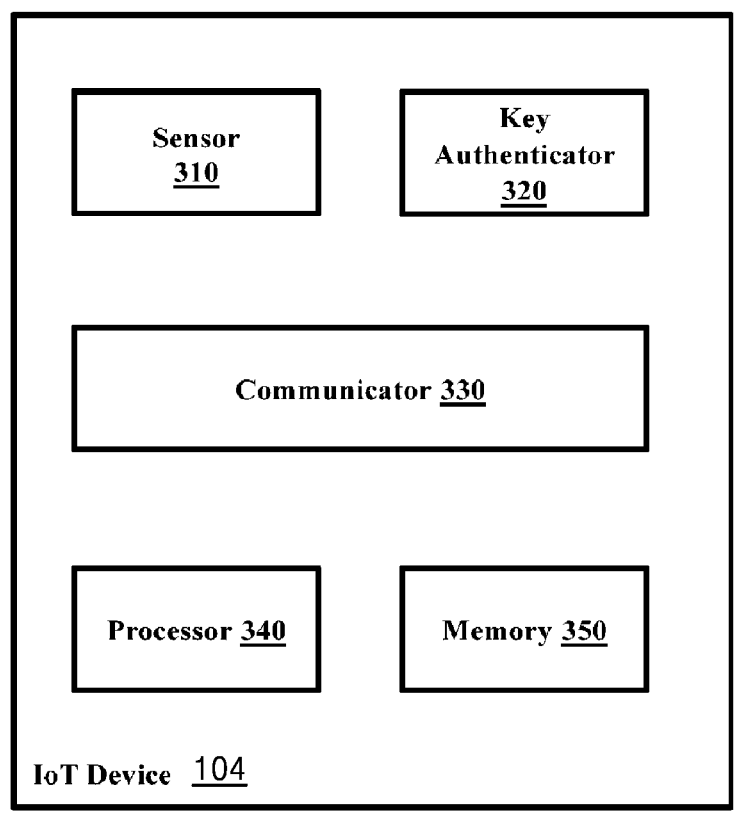
FIG. 3 is a block diagram illustrating hardware components of an IoT device, according to an embodiment of the disclosure.

FIG. 3 is a block diagram illustrating hardware components of an IoT devices 104 according to an embodiment of the disclosure. Each of the IoT devices 104 may include a sensor 310, a key authenticator 320, a communicator 330, a processor 340 and a memory 350. In some embodiments, the key authenticator 320, the communicator 330, and the processor 340 can be implemented as at least one hardware processor.

Referring to FIG. 3, the processor 340 may be, but not restricted to, a Central Processing Unit (CPU), a microprocessor, or a microcontroller. The processor 340 is coupled to the memory 350. The processor 340 executes sets of instructions stored on the memory 350. Any generated encryption keys and/or auto-onboard configuration data is stored on the memory 350.

The memory 350 includes storage locations to be addressable by the processor 340. The memory 350 is not limited to a volatile memory and/or a non-volatile memory. Further, the memory 350 can include one or more computer-readable storage media. The memory 350 can include non-volatile storage elements. For example, non-volatile storage elements can include magnetic hard discs, optical discs, floppy discs, flash memories, or forms of electrically programmable memories (EPROM) or electrically erasable and programmable (EEPROM) memories. The embodiments disclosed herein can be implemented through at least one software program running on at least one hardware device and performing network management functions to control the elements.

The sensor 310 may sense a user's input command and extract some features embedded in the user's input command. An initialization vector may be determined by the key generator (not shown) based on the features extracted from the input command. The key authenticator 320 may generate a decryption key based on the initialization vector.

In an embodiment, the sensor 310 can be a voice sensor such as microphone or any voice input receiver that captures voice commands from the user. The sensor 310 can further extract voice features from the voice command. The voice features can include but are not limited to a tract size, a vocal tract shape, a frequency, an amplitude, an aperiodic energy and a spectral slope in the voice command. An initialization vector is determined by the key generator (not shown) based on the voice features extracted from the voice command. The initialization vector is a fixed size input to a cryptographic scheme. The key authenticator 320 may generate a decryption key based on the initialization vector. Auto-onboard configuration data may be decrypted using the decryption key and may be shared with the IoT devices 104 using the communicator 330.

In another embodiment, the sensor 310 can be another kind of sensor other than the microphone or any voice input receiver. For example, the sensor 310 can be, but not limited to, a fingerprint recognition sensor, a touch sensitive sensor, an iris recognition sensor, a vein recognition sensor, a face recognition sensor, a temperature sensor, a writing recognition sensor, etc. For the aforementioned respective sensors, the voice command may be replaced by a fingerprint input, a touch input, an iris input, a vein input, a face input, a temperature input by touching a part of a human body or other things, a writing input, or a combination thereof.

Features may be extracted from each of the user's input. For example, ridge patterns of the fingerprint may be extracted from the fingerprint input, a body temperature may be extracted from the temperature input based on a touch by a human body, and a writing pattern of predetermined passwords or code may be extracted from the writing input.

The communicator 330 may be a transceiver that transmits and receives data through a communication network. The communication network can include a data network such as, but not restricted to, the Internet, local area network (LAN), wide area network (WAN), metropolitan area network (MAN) and the like. In certain embodiments, the communication network can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) and the like. Accordingly, the communicator 330 is included with communication components facilitating communications over the communication network. In some embodiments, the communication network can be an IoT network. In some other embodiments, the communicator 330 can receive and transmit data through the use of Bluetooth and/or ultrasonic waves.

In some embodiments, the key authenticator 320 may determine an encryption/a decryption key based on symmetric parameters common between the electronic device 102 and the IoT device 104. The symmetric parameters may include at least one of identification information associated with the electronic device 102 and the IoT device 104 and identification information associated with a user of the electronic device and a user of the IoT devices. The symmetric parameters can be a model type pertaining to the electronic device 102 and a model type of the IoT device 104. For example, if the IoT device 104 is a refrigerator, the identification information can be an indicative of the IoT device 104 being a refrigerator, the electronic device 102 being a smartphone or a tablet computer and also the birth date or the social security number of the user. The encryption key is generated based on the symmetric parameters common between the electronic device 102 and the IoT device 104. In some embodiments, a pre-shared decryption and/or encryption key can be generated using serial number of the electronic device and/or the IoT device(s), manufacturer name, a type or a model of the electronic device 102 and/or the IoT device 104, customer details and other details pertaining to the group of IoT devices 104, and a combination thereof. The pre-shared key is unique for the group of IoT devices 104 and is provided by the manufacturer of at least one of the electronic device and/or the IoT devices.

In some embodiments, the key authenticator 320 may retrieve the encryption/the decryption key in response to a determination that the IoT device 104 has received the encryption/the decryption key from a key source (not shown). The key source can be a data repository of the manufacturer. In some other embodiments, the key authenticator 320 may generate the encryption/the decryption key based on the symmetric parameters in response to a determination that the IoT device 104 has not received the encryption/the decryption key from the key source. The communicator 330 may share the generated encryption/decryption key with the key source through a communication network.

The key authenticator 320 may determine the decryption key generated based on the symmetric parameters common between the electronic device 102 and the IoT device 104. The key authenticator 320 retrieves the decryption key in response to a determination that the electronic device 102 has received the encryption key from a key source. The key source can be a data repository of the manufacturer. In some other embodiments, the key authenticator 320 generates the decryption key based on the symmetric parameter in response to determining that the electronic device 102 has not received the decryption key from the key source.

In some embodiments, voice-based onboarding works only where the voice command can reach the IoT devices 104. Typically, the voice command can reach the IoT devices 104 in an area with a radius of four to five meters. The reach of the voice command can also depend on how loud the voice command is. The IoT devices 104 in an area with a radius greater than four to five meters need to be on-boarded multiple times. With a pre-shared key from a key source, all the IoT devices 104 in a wide area can be on-boarded within a radio frequency range of the communicator 230 and the communicator 330.

Figure 4:
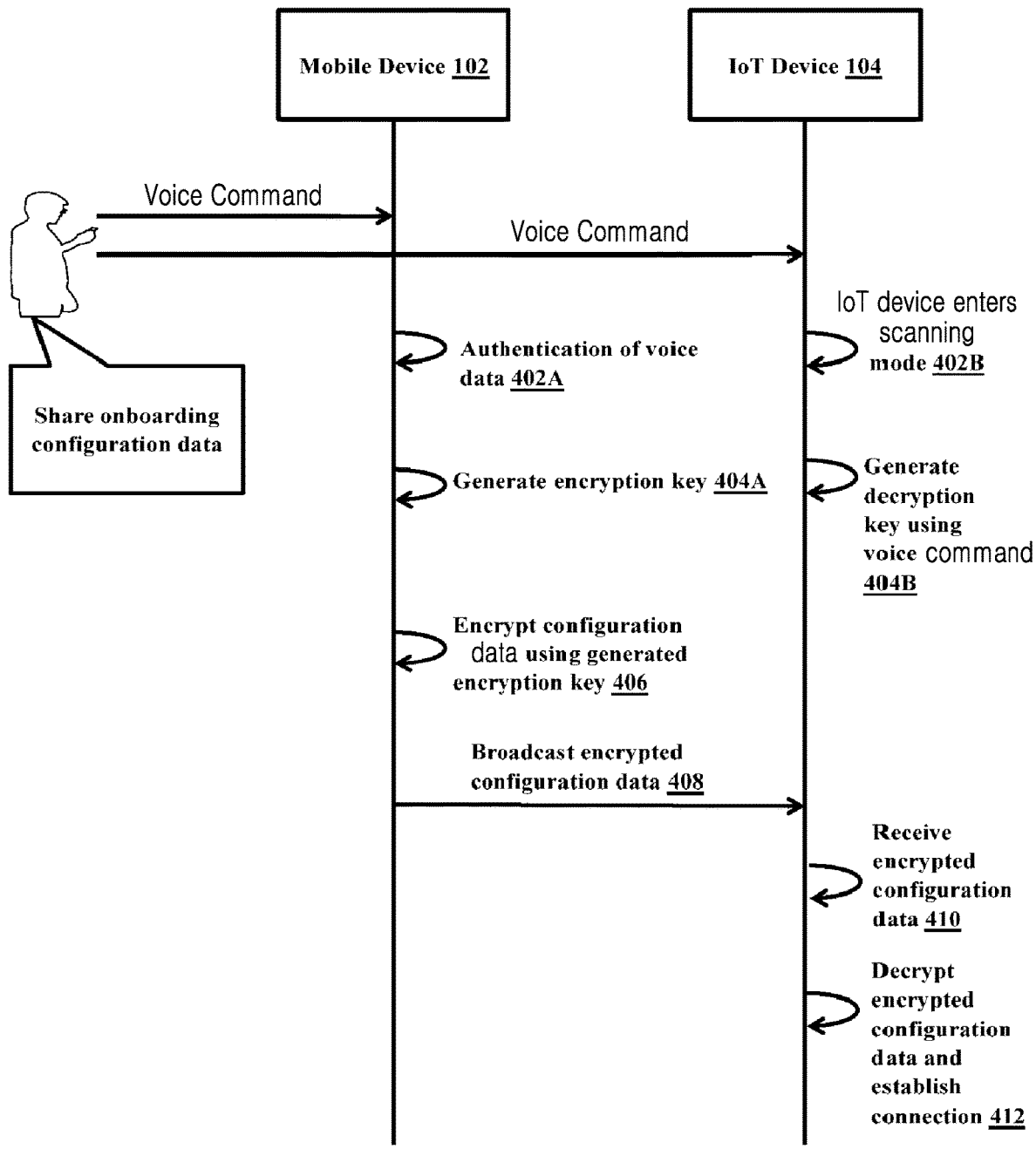
FIG. 4 is a sequence diagram illustrating a method to onboard IoT devices with voice-based key generation, according to an embodiment of the disclosure.

FIG. 4 illustrates a sequence diagram 400 for onboarding the IoT devices 104 through a voice-based solution according to an embodiment of the disclosure. In some embodiments, the onboarding of the IoT devices 104 may be performed based on another kind of user inputs other than a voice command such as a fingerprint input, a touch input, an iris input, a vein input, a face input, a temperature input by touching a part of a human body or other things, a writing input, etc. The user provides a voice command that reaches the electronic device 102 and the IoT devices 104. At the side of the electronic device 102, at step 402A, the voice command is authenticated based on voice features extracted from the voice command. Upon successful authentication, at step 404A, the key generator 220 may generate an encryption key based on the extracted voice features. Auto-configuration data is encrypted using the generated encryption key at step 406. The encrypted auto-configuration data is broadcast by the communicator 230 to the IoT devices 104 at step 408.

Referring to FIG. 4, prior to operations 406 and 408, at the side of the IoT device 104, the IoT device 104 may receive the voice command from the user. The communicator 330 scans for data signals constituting the auto-onboard configuration at operation 402B. At operation 404B, the key authenticator 320 may generate a decryption key using voice features extracted from the received voice command.

At operation 410, the IoT device 104 may receive the encrypted auto-configuration data through the communicator 330 over a communication network or any communication protocol such as Bluetooth, ultrasound Zigbee, wireless fidelity and the like. At operation 412, the IoT device 104 may decrypt the encrypted auto-configuration data using the generated decryption key and the auto-configuration data is used to onboard the IoT device 104 on the IoT network.

Figure 5:
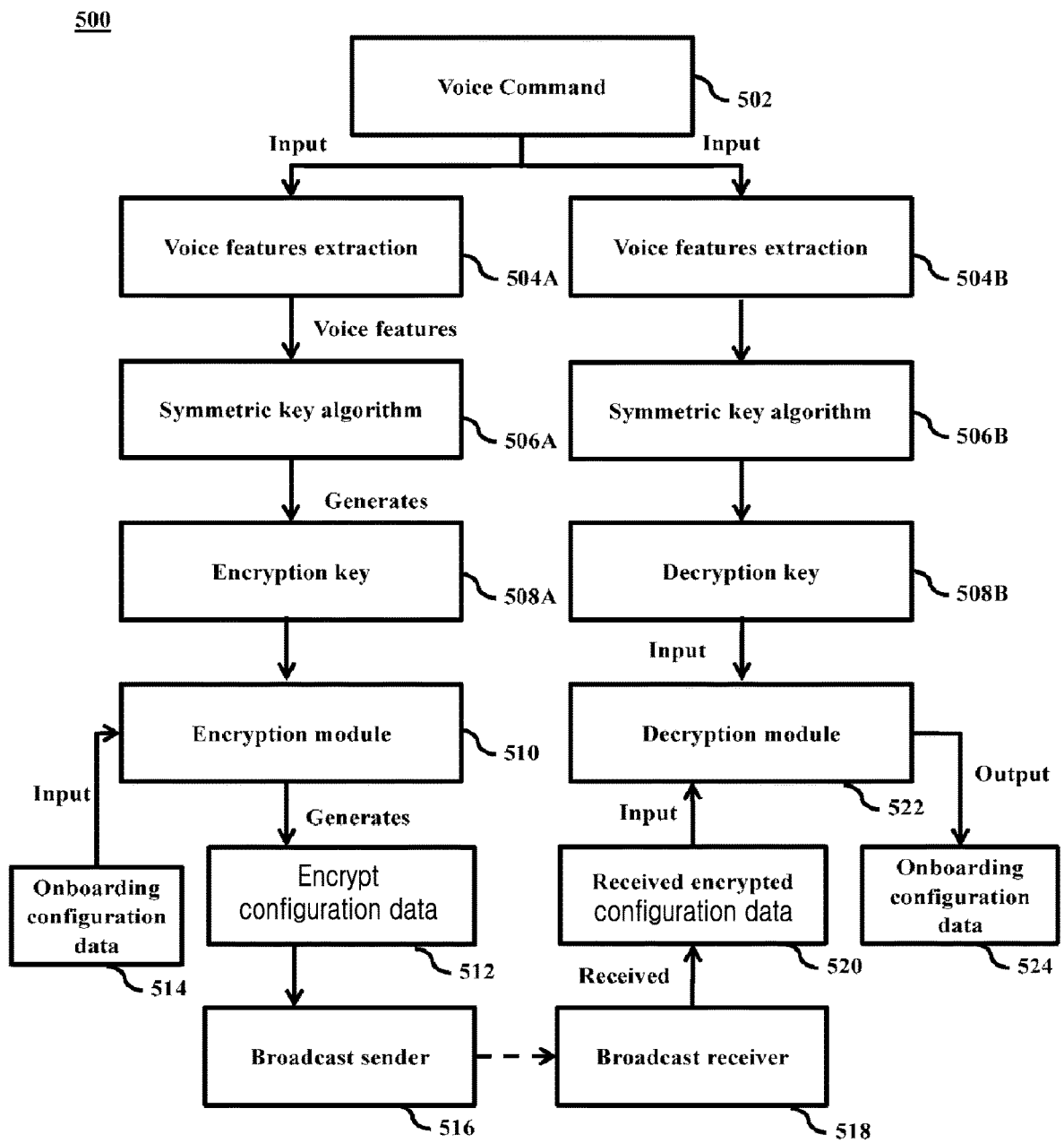
FIG. 5 is a flow diagram illustrating various actions performed by the electronic device and an IoT Device in onboarding the IoT device with voice-based key generation, according to an embodiment of the disclosure.

FIG. 5 illustrates a flow diagram 500 for onboarding the IoT devices 104 through a voice-based solution according to an embodiment of the disclosure. At operation 502, the user provides a voice command that reaches the electronic device 102 and the IoT device 104. At the side of the electronic device 102, at step 504A, the voice command is authenticated based on voice features of the voice command. Upon successful authentication, at steps 506A and 508A, the key generator 220 may generate the encryption key based on the extracted voice features using a symmetric key module. The symmetric key module can be part of the key generator 220. Auto-configuration data is encrypted using the generated encryption key at steps 510, 512, and 514. The encrypted configuration data is broadcast by the communicator 230 to the IoT devices 104 at step 516. The configuration data or auto-configuration data may correspond to the auto-onboard configuration data used in previous embodiments.

Referring to FIG. 5, prior to operations 510, 512 and 516, at the side of the IoT device 104, the IoT device 104 may receive the voice command from the user at operation 504B. The communicator 330 may scan for data signals constituting the auto-onboard configuration. At operations 506B and 508B, the key authenticator 320 may generate a decryption key using voice features extracted from the received voice command based on the same symmetric module used in step 506A.

At operations 518 and 520, the IoT device 104 may receive encrypted configuration data through the communicator 330 over a communication network or any communication protocol such as Bluetooth, ultrasound, Zigbee, wireless fidelity and the like. At operation 522, the encrypted configuration data is decrypted using the generated decryption key and the configuration data is used to onboard the IoT device 104 on the IoT network.

For example, the user may say "Hey Bixby, Share onboarding configuration details." In response to the triggering word "Hey Bixby," the electronic device 102 and the IoT devices 104 are activated and sense the user's voice, and turns on wireless communication module such as Bluetooth or ultrasound for receiving configuration details. In response to the remaining words "Share onboarding configuration details," the electronic device 102 and the IoT devices 104 may generate a unique key based on the voice parameters and/or text obtained from the words.

The electronic device 102 encrypts the onboarding configuration details using the encryption key generated, and broadcasts via wireless communication module such as Bluetooth or ultrasound. All devices to be on-boarded may receive the encrypted configuration details which are decrypted using the decryption key. All IoT devices 104 are automatically on-boarded using the decrypted configuration details. Configuration details or auto-onboard configuration data can be Access point credentials of the IoT network, server information of the IoT network, login credentials for connecting to the IoT network, user account information for logging in the IoT network, network configuration information for connecting to the IoT network and the like.

Further, the present disclosure includes voice features extracted from the voice command can be text-dependent or text-independent. The features obtained from the feature extraction part can be used as a seed or initialization vector for key generation using symmetric-key algorithms.

In an embodiment, the bulk onboarding of the IoT devices 104 is performed using voice commands. A user can provide voice data for generating an encryption key. After generating the encryption key, the electronic device 102 can encrypt configuration details and activates its Bluetooth beacon mode for broadcasting encrypted configuration details. Alternately, the electronic device 102 activates an ultrasound transmitter to broadcast the encrypted auto-configuration details through ultrasound-based communication. A target IoT device 104 enters scanning mode, while receiving the user's voice command, and generates a decryption key using the voice command. The target IoT device 104 can receive a data packet from the user and decrypt the data package using the decryption key. The connection is established with the IoT Hub 1041 using the decrypted data packet and the target IoT device 104 enters a lock mode and is locked for onboarding until reset or until the connection lasts.

In some embodiments, the electronic device 102 is on-boarded in the IoT network simultaneously with the IoT device 104. In some other embodiments, the electronic device 102 can be on-boarded first and then the IoT device 104 can be on-boarded. To the IoT devices' point of view, the onboarding means the IoT devices are joining the IoT network. In other embodiments, the electronic device 102 can be manually on-boarded first and then the IoT device 104 can be on-boarded through the operations 504B, 506B, 508B, 516, 518, 520, 522, and 524 as shown in FIG. 5.

Figure 6:
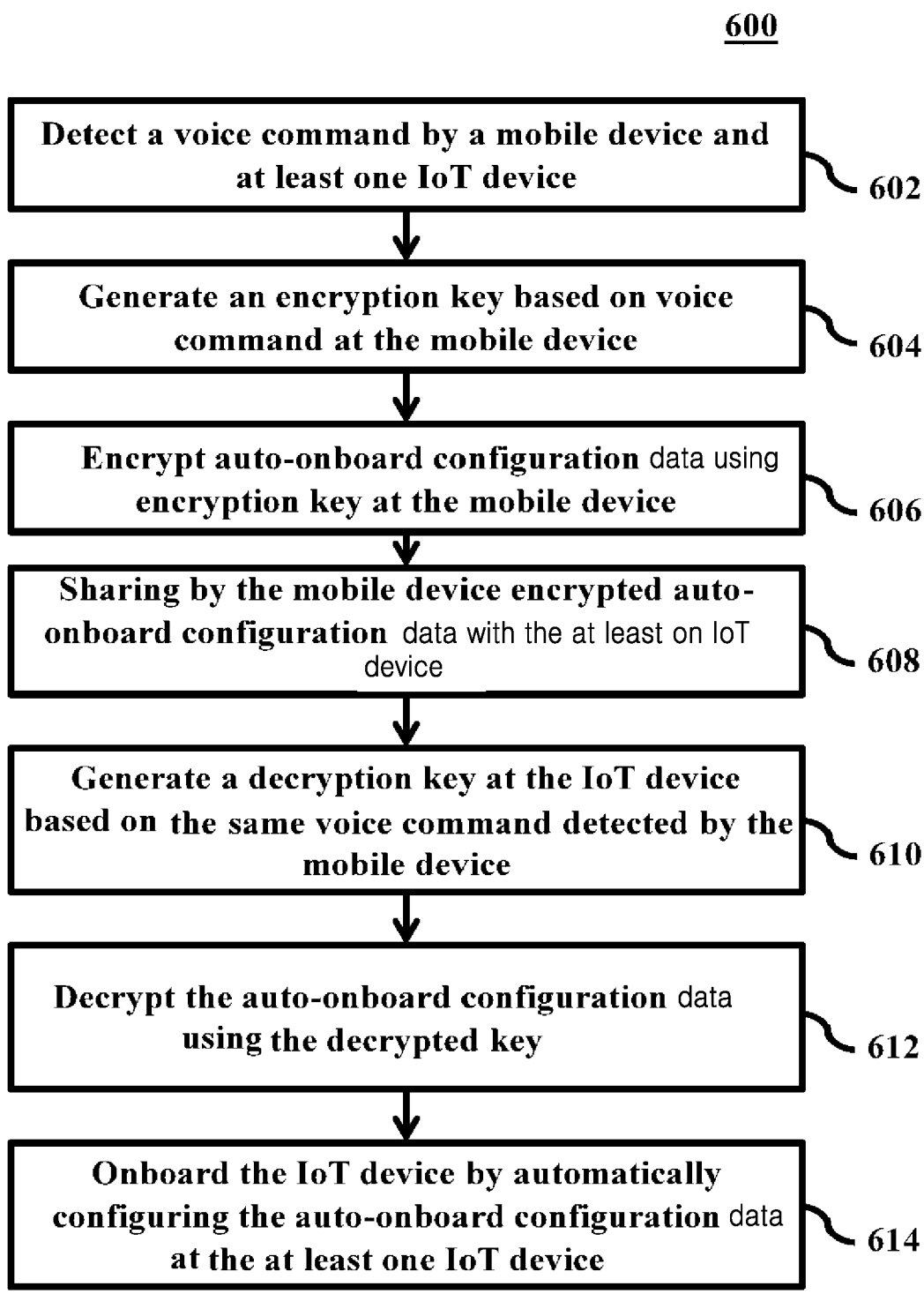
FIG. 6 is a flow diagram illustrating a method for onboarding bulk IoT devices with voice-based key generation, according to an embodiment of the disclosure.

FIG. 6 illustrates a flow diagram 600 for onboarding the IoT device(s) 104 according to an embodiment of the disclosure. At operation 602, the electronic device 102 and the IoT device 104 may detect a voice command. The key generator 220 of the electronic device 102 may generate an encryption key based on the voice features extracted from the voice command at operation 604. At operation 606, auto-onboard configuration data is encrypted using the encryption key.

Referring to FIG. 6, at operation 608, the encrypted auto-onboard configuration data is shared with the IoT device 104. The key authenticator 320 of the IoT device 104 (shown in FIG. 3) may generate a decryption key based on the voice command at operation 610. The received auto-onboard configuration is decrypted using the decryption key at operation 612. The IoT device is on-boarded at operation 614 based on the auto-configuration data that has been decrypted.

Figure 7:
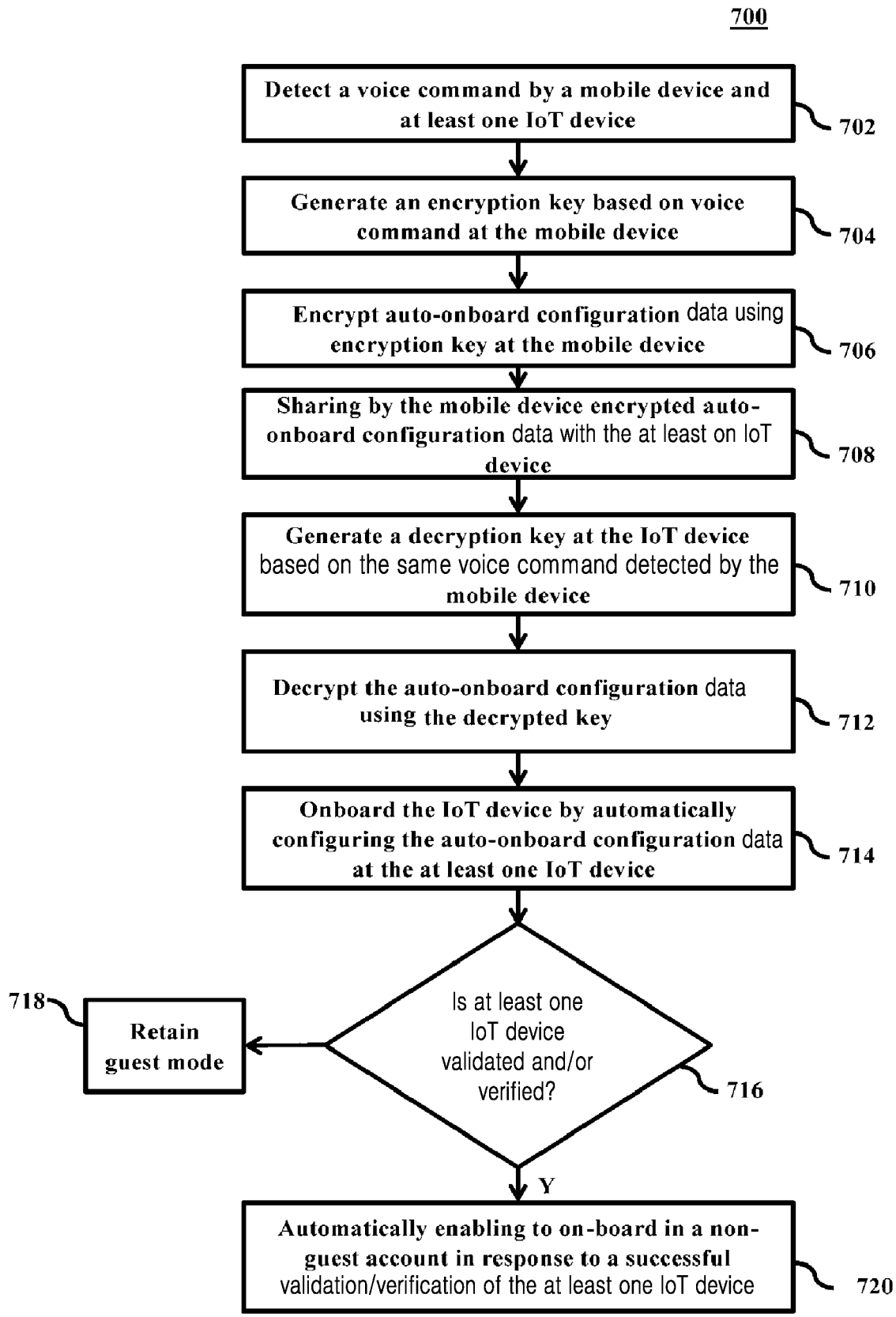
FIG. 7 is a flow diagram illustrating a method for onboarding bulk IoT devices in a guest mode and a non-guest mode with voice-based key generation, according to an embodiment of the disclosure.

FIG. 7 is a flow diagram illustrating a method 700 to onboard the IoT device 104 according to an embodiment of the disclosure. At operation 702, the electronic device 102 and the IoT device 104 may detect a voice command. The key generator 220 of the electronic device 102 may generate an encryption key based on the voice features extracted from the voice command at operation 704. At operation 706, auto-onboard configuration data is encrypted using the encryption key.

Referring to FIG. 7, at operation 708, the encrypted auto-onboard configuration data is shared with the IoT device 104. The key authenticator 320 of the IoT device 104 (shown in FIG. 3) may generate a decryption key based on the voice features extracted from the voice command at operation 710. The received auto-onboard configuration is decrypted using the decryption key at operation 712. The IoT device is on-boarded in a guest mode at operation 714 based on the auto-configuration data that has been decrypted. The electronic device 102 receives a voice response indicative of the IoT device 104 being on-boarded in a guest mode. Onboarding in a guest mode provides limited functions to the IoT device 104. For example, by onboarding in the guest mode, the IoT device 104 may not be connected to the Internet but be connected to a local IoT network only. At step 716, the IoT hub 1041 (shown in FIGS. 1A and 1B) and/or the electronic device 102 may validate and/or verify the on-boarded IoT device 104 to be in a guest mode or in a non-guest mode. Based on rules or preset network policies, the IoT device 104 can be enabled to be on-boarded in a non-guest mode (account) (operation 720) or be retained in the guest mode (operation 718).

Figure 8A:
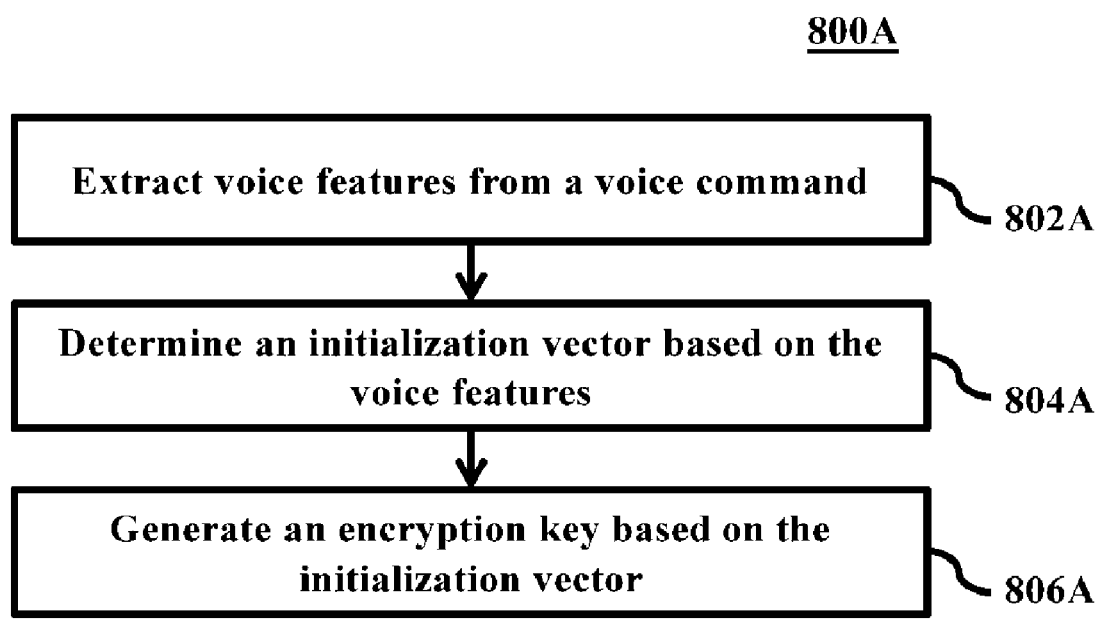
FIGS. 8A and 8B are flow diagrams illustrating a method for determining an encryption key and a decryption key from the same voice command, according to embodiments of the disclosure.
Figure 8B:
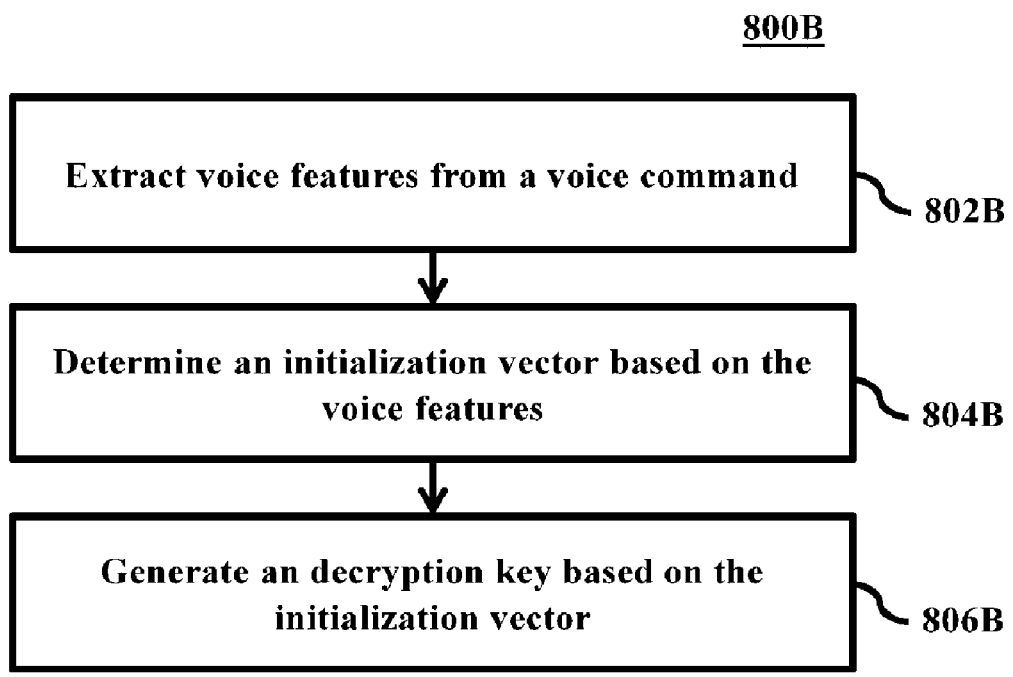

FIG. 8A and FIG. 8B are flow diagrams illustrating methods 800A and 800B to generate the encryption and/or decryption key according to an embodiment of the disclosure.

Referring to FIG. 8A and FIG. 8B, at operations 802A and 802B, voice features are extracted by the sensor 210 and the sensor 310 respectively. The key generator 220 and the key authenticator 320 determines an initialization vector based on the voice features at operations 804A and 804B respectively. At operation 806A, the key generator 220 generates the encryption key based on the initialization vector. At operation 806B, as shown in FIG. 8B, the decryption key is generated by the key authenticator 320 based on the initialization vector.

FIG. 9 is a flow diagram illustrating a method 900 to onboard the IoT device 104 using a pre-shared key according to an embodiment of the disclosure.

Referring to FIG. 9, at operation 902, the electronic device 102 determines an encryption key based on a symmetric parameter common between the electronic device 102 and the IoT device 104. At step 904, auto-onboard configuration data is encrypted using the encryption key. At steps 906 and 908, the IoT device 104 receives encrypted auto-onboard configuration data from the electronic device 102. The IoT device 104 determines a decryption key based on the symmetric parameter and uses the decryption key to decrypt the auto-onboard configuration data received from the electronic device 102 at operations 910 and 912. At operation 914, the IoT device 104 is automatically on-boarded in the IoT network using the auto-onboard configuration.

The decryption key is determined by validating/verifying whether the IoT device 104 has received the same key from a key source. For example, all new IoT devices 104 can have a pre-shared key from a corresponding manufacturer. The pre-shared key is used for decrypting the encrypted message. A user buying the IoT devices 104 can independently receive an encryption key corresponding to the decryption key stored on the IoT device. An order to buy IoT devices in a bulk quantity is placed. The manufacturer provides the same preconfigured key corresponding to the pre-shared key for all the IoT devices. All the IoT devices 104 are powered on. One IoT device 104 is on-boarded manually. The on-boarded IoT device 104 may broadcast the auto-onboard configuration data encrypted with the pre-shared key to all the other IoT devices 104. The pre-shared key is provided by the manufacturer to the user after the order is placed. The auto-onboard configuration data is decrypted with the pre-shared decryption key.

Figure 10:
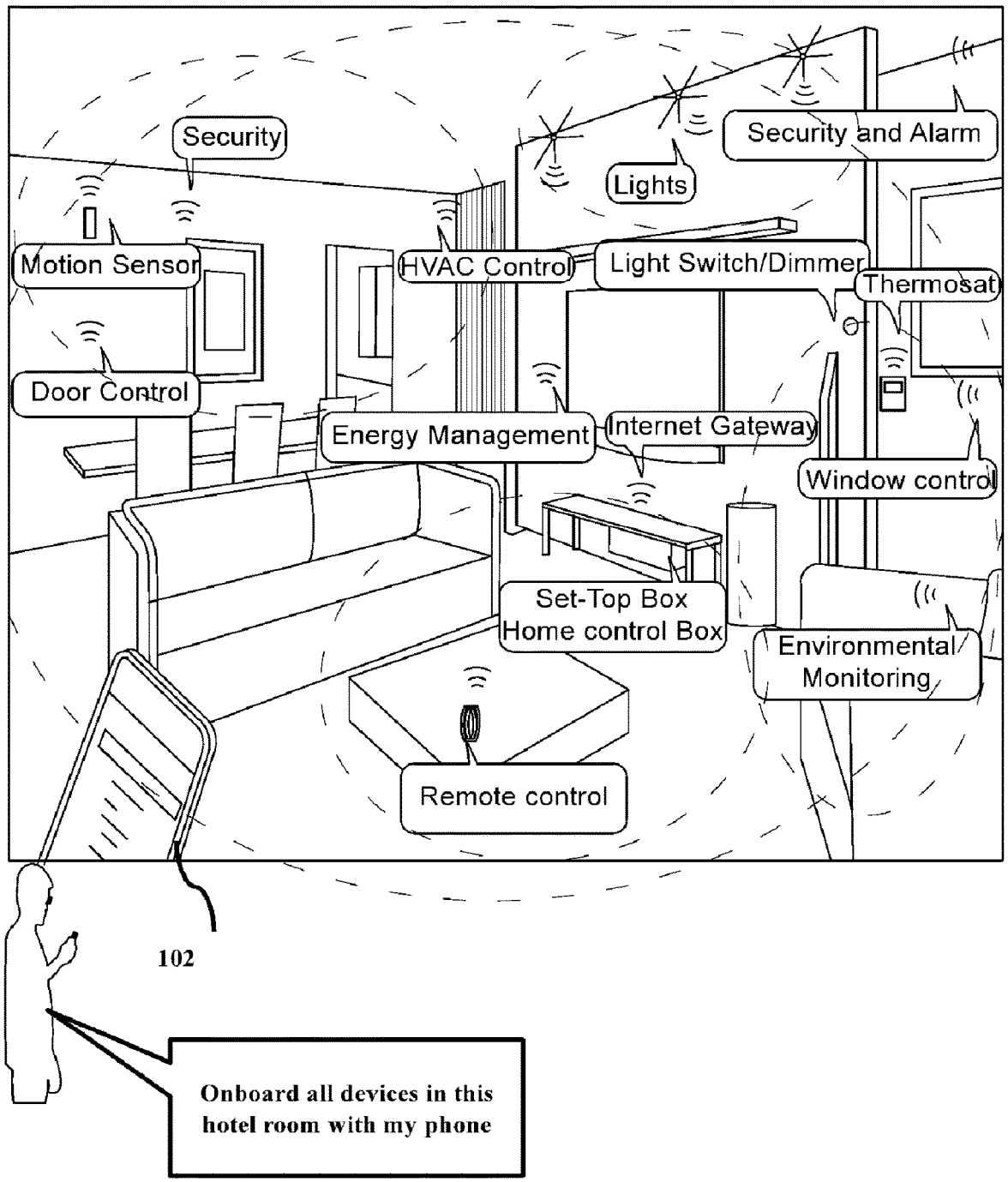
FIG. 10 illustrates an example scenario of guest experience in a hotel during check-in, according to an embodiment of the disclosure.

FIG. 10 illustrates a use case 1000 of guest experience in a hotel during check-in, according to embodiments of the disclosure.

Referring to FIG. 10, the user may provide a voice command to onboard all IoT devices in the room with the electronic device 102. Using the operations shown in FIGS. 4, 5, 6, 7, 8A, and 8B, all the IoT devices in the room are automatically on-boarded with the electronic device 102. In some embodiments, the devices in the room can be controlled from the electronic device 102 upon successful onboarding.

Figure 11A:
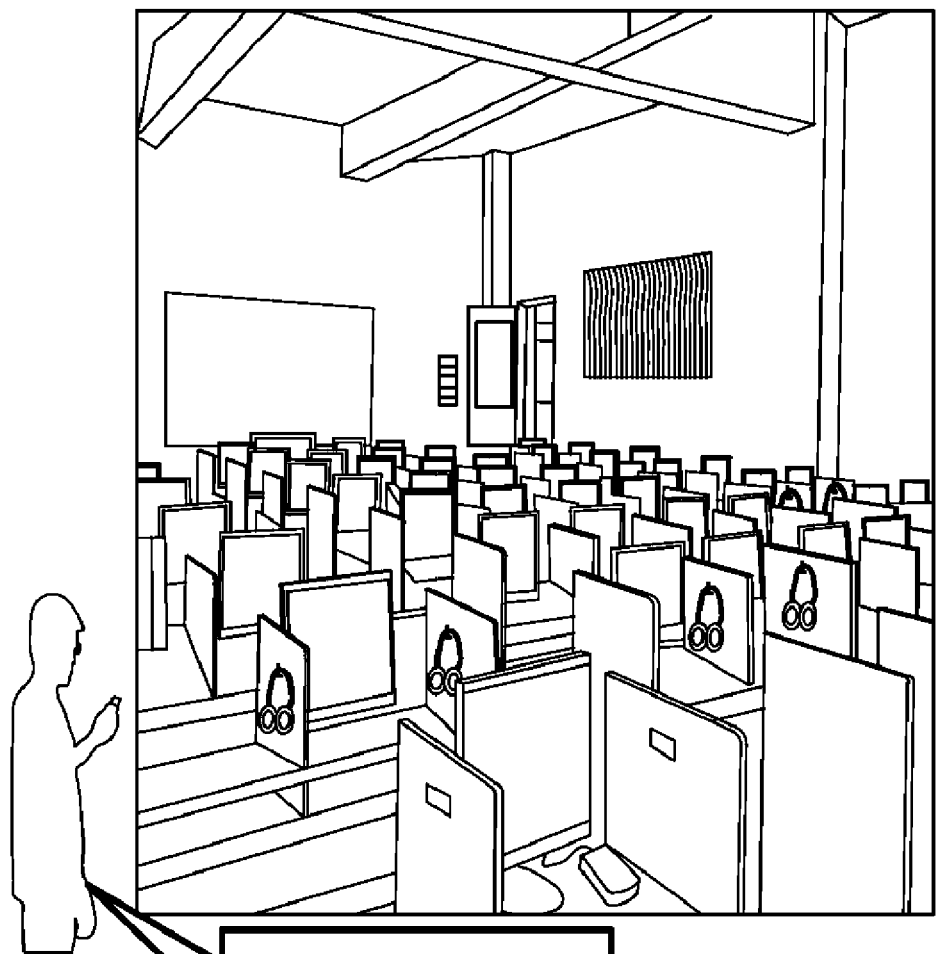
FIGS. 11A and 11B illustrate an example scenario of guest experience in a classroom, according to an embodiment of the disclosure.
Figure 11B:
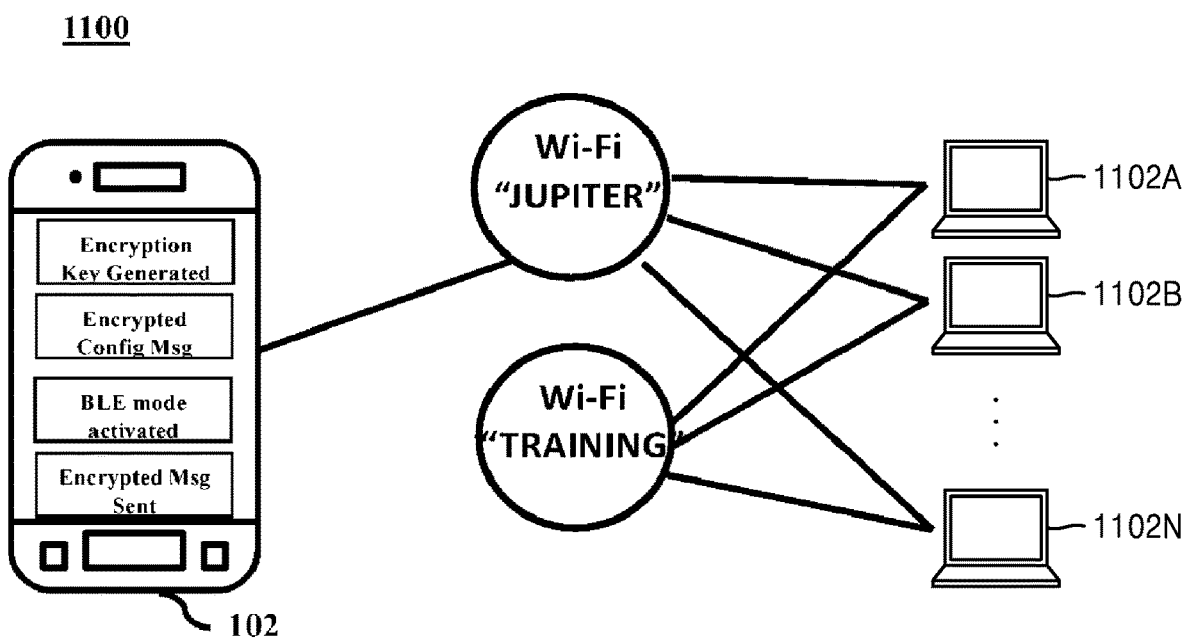

FIGS. 11A and 11B illustrate an example scenario 1100 for onboarding of bulk number of personal computers 1102A, 1102B, etc., to 1102N, in a training room with an access point "Jupiter" according to an embodiment of the disclosure.

Referring to FIG. 11A and FIG. 11B, the user may provide a writing input command of "Jupiter" that is detected by the electronic device 102, a network router operating the network "Jupiter" and the personal computers 1102A to 1102N. All network configuration details are automatically shared with the personal computers and the personal computers are automatically connected to the network "Jupiter." In an example, the personal computers 1102A to 1102N may already be connected to a network "Training" that is the network provided in the training room. When the user prefers that the personal computers 1102A to 1102N be connected to the network "Jupiter," the writing input command is given by the user and accordingly the personal computers 1102A to 1102N are on-boarded on the network "Jupiter."

Figure 12A:
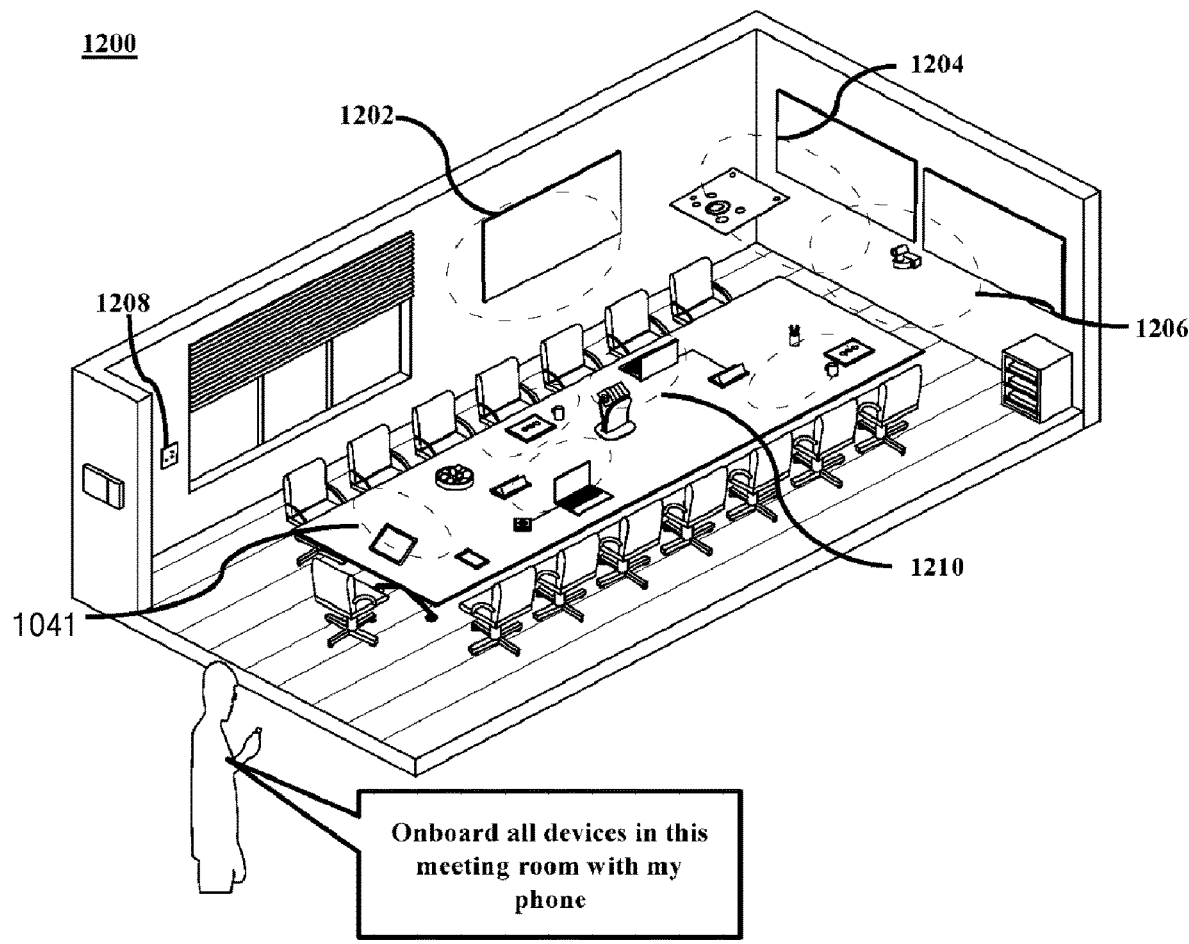
FIGS. 12A and 12B illustrate an example scenario of guest experience in a conference, according to an embodiment of the disclosure.
Figure 12B:
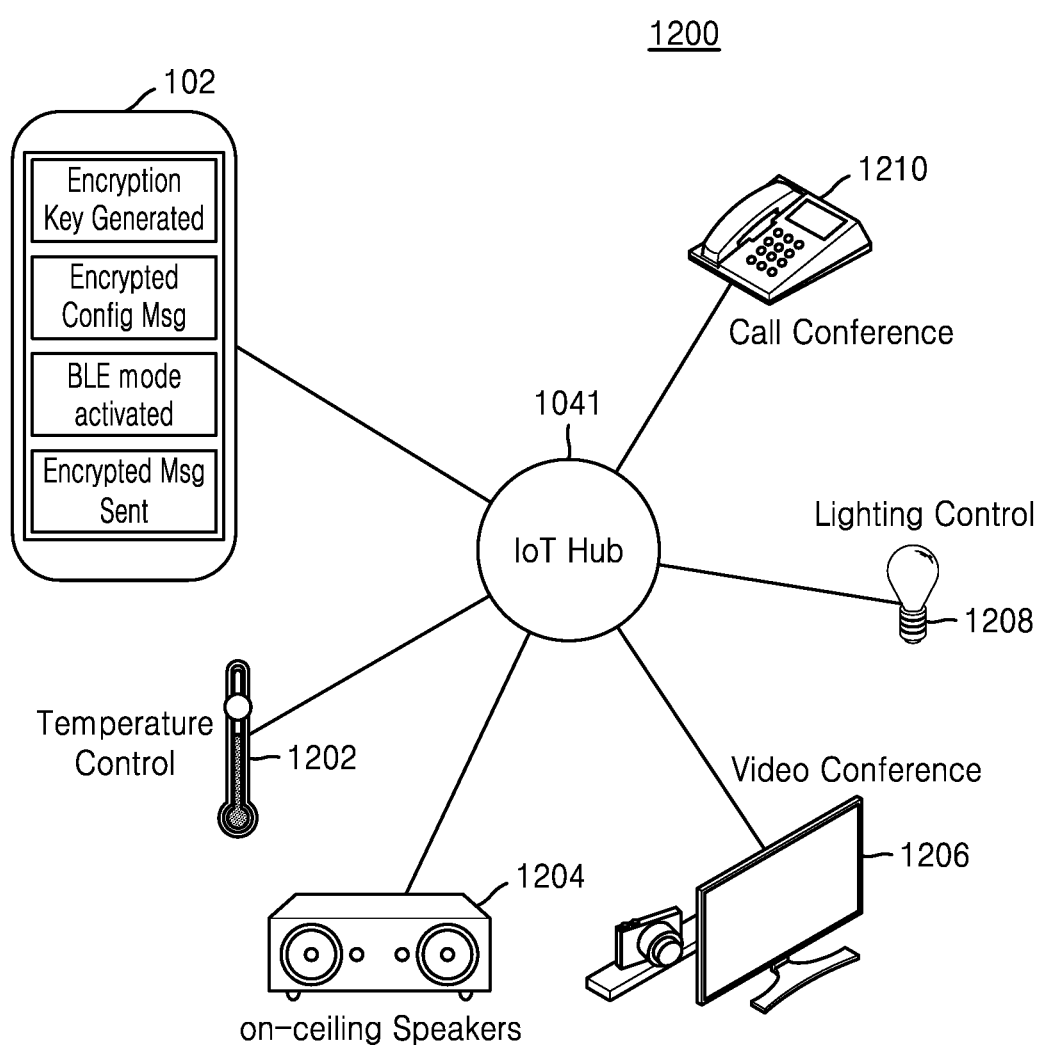

FIGS. 12A and 12B illustrate an example scenario 1200 where all devices, such as a temperature controller 1202, in-ceiling speakers 1204, video conferencing equipment 1206, lighting controllers 1208 and a call conferencing equipment 1210, in a meeting room are automatically on-boarded when a user provides the a command as shown according to an embodiment of the disclosure.

Referring to FIGS. 12A and 12B, the devices 1202-1210 detect the user command and each of the devices generates a decryption key based on the features extracted from the user command. The encrypted auto-onboard configuration data from the electronic device 102 is transmitted through a network such as Bluetooth or ultrasound to the devices 1202 to 1210 and is decrypted at the devices 1202 to 1210 using the decryption key. Accordingly, the devices 1202 to 1210 are on-boarded with the electronic device 102 based on the auto-onboard configuration data. The devices 1202 to 1210 establish a connection with the IoT hub 1041 and enter a locked mode. The devices 1202 to 1210 are locked for onboarding until the connection lasts or is reset.

Figure 13A:
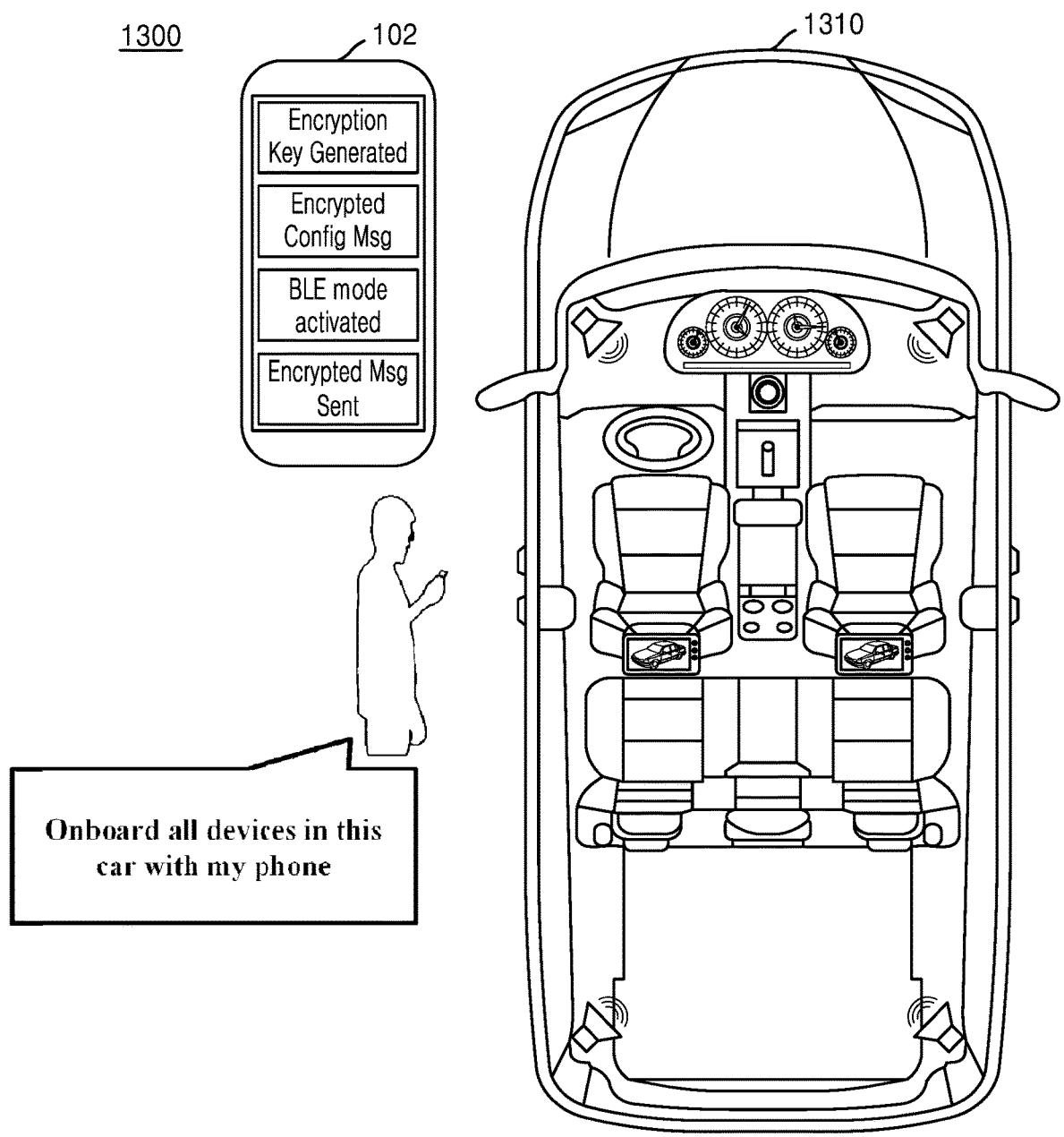
FIGS. 13A and 13B illustrate an example scenario where devices in a car are on-boarded with an electronic device of a driver or a passenger, according to an embodiment of the disclosure.
Figure 13B:
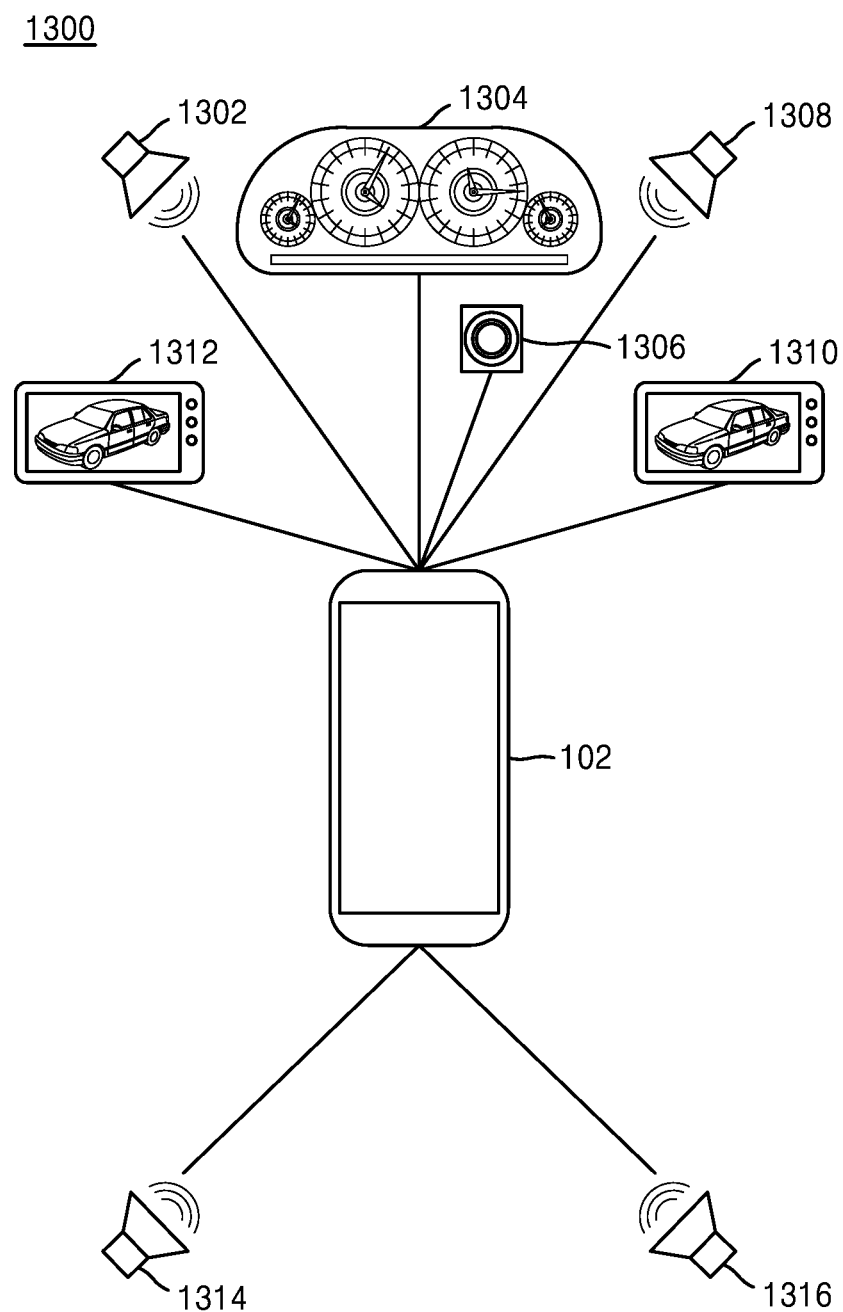

FIG. 13A and FIG. 13B illustrate an example scenario 1300 where devices 1302, 1304, 1306, 1308, 1310, 1312, 1314 and 1316 in a car are on-boarded with the electronic device 102 of a driver or a passenger according to an embodiment of the disclosure. Upon detecting a user command, the IoT devices 1302, 1304, 1306, 1308, 1310, 1312, 1314 and 1316 in the car such as but not limited to an air conditioner, speakers, dashboard controls and the like can be on-boarded with the electronic device 102 of the driver or the electronic device of the passenger for ease of control of all devices while driving.

Referring to FIGS. 13A and 13B, the disclosed method can be useful for scenarios like Conference Room, Training room, Education Institute, Corporate meeting rooms with many gadgets like laptops, tablet computers, desktop computers and the like which can be on-boarded easily for every session.

The embodiments disclosed herein can be implemented through at least one software program running on at least one hardware device and performing network management functions to control the elements. The elements shown in FIGS. 1A-13B include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus for joining an Internet of Things (IoT) network as an IoT device, the apparatus comprising:
  a communicator;
  a voice sensor; and
  at least one processor configured to:
    based on the voice sensor detecting, at a first time point, a user's voice command detected by at least one voice sensor of an electronic device at same first time point, the electronic device being located in vicinity of the apparatus to detect the user's voice command, activate a wireless communication interface and generate a decryption key based on features extracted from the user's voice command,
    after generating the decryption key, receive, from the electronic device, encrypted auto-onboard configuration data via the activated wireless communication interface, the auto-onboard configuration data being encrypted by the electronic device based on the user's voice command and associated with the IoT network, wherein the encrypted auto-onboard configuration data comprises information of an auto-onboard configuration by which the apparatus joins the IoT network, and
    based on the communicator receiving the encrypted auto-onboard configuration data encrypted by the electronic device, decrypt the encrypted auto-onboard configuration data using the decryption key, obtain auto-onboard configuration data which automatically configures the apparatus for joining the IoT network, and join the IoT network using the auto-onboard configuration data.

2. The apparatus of claim 1, wherein the generating of the decryption key comprises:
  determining an initialization vector based on the features; and
  generating the decryption key based on the initialization vector.

3. The apparatus of claim 1, wherein the features comprise at least one of voice text, a tract size, a vocal tract shape, a frequency, an amplitude and aperiodic energy, or a spectral slope in the user's voice command.

4. The apparatus of claim 1, wherein the at least one processor is further configured to transmit, to the electronic device via the communicator, a response indicating that the apparatus is on-boarded in a guest account of the IoT network.

5. The apparatus of claim 1, wherein the auto-onboard configuration data comprises at least one of access point credentials of the IoT network, server information of the IoT network, login credentials for connecting to the IoT network, user account information for logging in the IoT network, or network configuration information for connecting to the IoT network.

6. The apparatus of claim 1, wherein the at least one processor is further configured to generate the decryption key by determining the decryption key based on symmetric parameters comprising at least one of identification information associated with the electronic device and the apparatus, identification information associated with a user of the electronic device and a user of the apparatus, or a model type of the electronic device and a model type of the apparatus.

7. The apparatus of claim 1, wherein the at least one processor is further configured to:
  authenticate the user's voice command based on the features, and
  generate the decryption key in response to determining that the authenticating is successful.

8. An electronic device for onboarding at least one Internet of Things (IoT) device in an IoT network, the electronic device comprising:
  a communicator;
  a voice sensor; and
  at least one processor configured to:
    based on the voice sensor detecting, at a first time point, a user's voice command detected by one or more sensors of at least one IoT device at same first time point, the at least one IoT device being located in vicinity of the electronic device to detect the user's voice command at a same time, activate a wireless communication interface and generate an encryption key based on features extracted from the user's voice command and encrypt auto-onboard configuration data associated with the IoT network using the encryption key, wherein the auto-onboard configuration data comprises an auto-onboard configuration by which the at least one IoT device detecting the user's voice command joins the IoT network, and
    after encrypting the auto-onboard configuration data, control the communicator to transmit the encrypted auto-onboard configuration data which automatically configures the at least one IoT device to automatically onboard the at least one IoT device in the IoT network.

9. The electronic device of claim 8, wherein the at least one processor is further configured to:
  determine an initialization vector based on the features, and
  generate the encryption key based on the initialization vector.

10. The electronic device of claim 8, wherein the features comprise at least one of voice text, a tract size, a vocal tract shape, a frequency, an amplitude and aperiodic energy, or a spectral slope in the user's voice command.

11. The electronic device of claim 8, wherein the at least one processor is further configured to control the communicator to receive a response indicating that the at least one IoT device is on-boarded in a guest account of the IoT network.

12. The electronic device of claim 8, wherein the auto-onboard configuration data comprises at least one of access point credentials of the IoT network, server information of the IoT network, login credentials for connecting to the IoT network, user account information for logging in the IoT network, or network configuration information for connecting to the IoT network.

13. The electronic device of claim 8, wherein the at least one processor is further configured to generate the encryption key by determining the encryption key based on symmetric parameters which comprise at least one of identification information associated with the electronic device and the at least one IoT device, identification information associated with a user of the electronic device and a user of the at least one IoT device, or a model type of the electronic device and a model type of the at least one IoT device.

* * * * *